(12) United States Patent
Hannuksela et al.

(10) Patent No.: US 10,582,231 B2
(45) Date of Patent: Mar. 3, 2020

(54) METHOD, AN APPARATUS, A COMPUTER PROGRAM FOR VIDEO CODING

(71) Applicant: Nokia Technologies Oy, Espoo (FI)

(72) Inventors: Miska Hannuksela, Tampere (FI); Emre Aksu, Tampere (FI)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 15/578,288

(22) PCT Filed: May 31, 2016

(86) PCT No.: PCT/FI2016/050381
§ 371 (c)(1),
(2) Date: Nov. 30, 2017

(87) PCT Pub. No.: WO2016/193544
PCT Pub. Date: Dec. 8, 2016

(65) Prior Publication Data
US 2018/0146225 A1    May 24, 2018

(30) Foreign Application Priority Data

Jun. 3, 2015  (GB) .................................. 1509567.2

(51) Int. Cl.
*H04N 21/80* (2011.01)
*H04N 21/2343* (2011.01)
(Continued)

(52) U.S. Cl.
CPC ... *H04N 21/234327* (2013.01); *H04N 21/236* (2013.01); *H04N 21/234345* (2013.01);
(Continued)

(58) Field of Classification Search
CPC ......... H04N 21/234327; H04N 21/845; H04N 21/8543; H04N 21/234345;
(Continued)

(56) References Cited

U.S. PATENT DOCUMENTS 7,289,506 B1 * 10/2007 Hannuksela ..... H04N 21/23432
370/394
7,643,560 B2 * 1/2010 Hong .................. H04N 21/242
375/240.25
(Continued)

FOREIGN PATENT DOCUMENTS

CN   104160706 A   11/2014
EP   1936992 A1    6/2008
(Continued)

OTHER PUBLICATIONS

JCT-VC, "High Efficiency Video Coding (HEVC) text specification draft 10", Jan. 14-23, 2013 (Year: 2013).*
(Continued)

*Primary Examiner* — Philip P. Dang
(74) *Attorney, Agent, or Firm* — Alston & Bird LLP

(57) ABSTRACT

There are disclosed various methods, apparatuses and computer program products for video encoding. In some embodiments a method comprises including two or more entities into a container file, wherein each entity is a media item or a media track; and indicating in one of the following: the container file or a description of the container file; that the two or more entities are playable in the order they appear in the container file to achieve progressive refinement. In addition, a method, an apparatus and a computer program product for parsing information is provided.

20 Claims, 7 Drawing Sheets

(51) Int. Cl.

| | | |
|---|---|---|
| *H04N 21/236* | (2011.01) | |
| *H04N 21/434* | (2011.01) | |
| *H04N 21/4402* | (2011.01) | |
| *H04N 21/845* | (2011.01) | |
| *H04N 21/8543* | (2011.01) | |
| *H04N 21/81* | (2011.01) | |
| H04N 19/70 | (2014.01) | |
| H04N 19/30 | (2014.01) | |

(52) U.S. Cl.
CPC ....... *H04N 21/434* (2013.01); *H04N 21/4402* (2013.01); *H04N 21/8146* (2013.01); *H04N 21/845* (2013.01); *H04N 21/8456* (2013.01); *H04N 21/8543* (2013.01); H04N 19/30 (2014.11); H04N 19/70 (2014.11)

(58) Field of Classification Search
CPC ........... H04N 21/8146; H04N 21/8456; H04N 21/236; H04N 21/434; H04N 21/4402; H04N 19/70; H04N 19/30
See application file for complete search history.

(56) References Cited

U.S. PATENT DOCUMENTS

| | | | |
|---|---|---|---|
| 7,991,236 B2* | 8/2011 | Guo | H04N 19/30 |
| | | | 382/238 |
| 8,170,116 B2* | 5/2012 | Wang | H04N 19/70 |
| | | | 375/240.25 |
| 8,315,308 B2* | 11/2012 | Bao | H04N 19/105 |
| | | | 375/240.12 |
| 8,396,134 B2* | 3/2013 | Hong | H04N 19/105 |
| | | | 375/240.12 |
| 9,538,137 B2* | 1/2017 | Lu | H04N 21/2343 |
| 9,635,396 B2* | 4/2017 | Wang | H04N 21/234327 |
| 9,813,722 B2* | 11/2017 | Hannuksela | H04N 19/70 |
| 9,813,736 B2* | 11/2017 | Chen | H04N 19/597 |
| 9,924,189 B2* | 3/2018 | Nakagami | H04N 19/137 |
| 10,070,125 B2* | 9/2018 | Hannuksela | H04N 19/70 |
| 10,116,948 B2* | 10/2018 | Deshpande | H04N 19/70 |
| 2002/0021758 A1 | 2/2002 | Chui | |
| 2002/0037046 A1* | 3/2002 | Schaar | H04N 19/61 |
| | | | 375/240.2 |
| 2003/0177247 A1 | 9/2003 | Dunning et al. | |
| 2005/0086852 A1 | 4/2005 | Frojdh Per et al. | |
| 2005/0254072 A1 | 11/2005 | Hirai et al. | |
| 2007/0086521 A1* | 4/2007 | Wang | H04N 21/23406 |
| | | | 375/240.1 |
| 2007/0160133 A1* | 7/2007 | Bao | H04N 19/105 |
| | | | 375/240.1 |
| 2008/0089411 A1* | 4/2008 | Wenger | H04N 19/105 |
| | | | 375/240.12 |
| 2008/0165848 A1* | 7/2008 | Ye | H04N 19/105 |
| | | | 375/240.13 |
| 2008/0205529 A1* | 8/2008 | Hannuksela | H04N 19/37 |
| | | | 375/240.26 |
| 2009/0245347 A1* | 10/2009 | Lee | H04N 19/597 |
| | | | 375/240.01 |
| 2009/0290648 A1* | 11/2009 | Onno | H04N 21/23424 |
| | | | 375/240.27 |
| 2010/0135393 A1* | 6/2010 | Ying Gao | H04N 19/61 |
| | | | 375/240.15 |
| 2010/0142622 A1* | 6/2010 | Le Leannec | H04N 19/147 |
| | | | 375/240.16 |
| 2011/0238789 A1 | 9/2011 | Luby et al. | |
| 2012/0063516 A1* | 3/2012 | Kwon | H04N 19/56 |
| | | | 375/240.16 |
| 2012/0163472 A1* | 6/2012 | Sole Rojals | H04N 19/176 |
| | | | 375/240.24 |
| 2012/0183077 A1* | 7/2012 | Hong | H04N 19/70 |
| | | | 375/240.25 |
| 2012/0194519 A1 | 8/2012 | Bissell et al. | |
| 2012/0201301 A1* | 8/2012 | Bao | H04N 19/105 |
| | | | 375/240.14 |
| 2012/0269275 A1* | 10/2012 | Hannuksela | H04N 13/0048 |
| | | | 375/240.25 |
| 2012/0275517 A1* | 11/2012 | Boyce | H04N 19/70 |
| | | | 375/240.12 |
| 2013/0010871 A1* | 1/2013 | Kwon | H04N 19/33 |
| | | | 375/240.16 |
| 2013/0022114 A1 | 1/2013 | Lee et al. | |
| 2013/0034170 A1* | 2/2013 | Chen | H04N 13/00 |
| | | | 375/240.25 |
| 2013/0188738 A1 | 7/2013 | Hannuksela et al. | |
| 2013/0191550 A1 | 7/2013 | Hannuksela | |
| 2013/0235152 A1* | 9/2013 | Hannuksela | H04N 19/597 |
| | | | 348/43 |
| 2013/0243391 A1 | 9/2013 | Park et al. | |
| 2014/0003527 A1* | 1/2014 | Tourapis | H04N 19/147 |
| | | | 375/240.16 |
| 2014/0089778 A1 | 3/2014 | Hayden | |
| 2014/0092978 A1* | 4/2014 | Bugdayci | H04N 19/30 |
| | | | 375/240.16 |
| 2014/0185670 A1 | 7/2014 | Wang | |
| 2014/0204271 A1 | 7/2014 | Kim et al. | |
| 2014/0218473 A1* | 8/2014 | Hannuksela | H04N 19/597 |
| | | | 348/43 |
| 2014/0359154 A1 | 12/2014 | Tripathy | |
| 2015/0092837 A1* | 4/2015 | Chen | H04N 19/597 |
| | | | 375/240.02 |
| 2015/0103926 A1 | 4/2015 | Hannuksela | |
| 2015/0245063 A1* | 8/2015 | Rusanovskyy | H04N 19/597 |
| | | | 375/240.12 |
| 2015/0288996 A1 | 10/2015 | Van der Schaar et al. | |
| 2015/0365687 A1* | 12/2015 | Le Floch | H04N 19/17 |
| | | | 375/240.24 |
| 2016/0029091 A1* | 1/2016 | Le Floch | H04N 21/234345 |
| | | | 375/240.26 |
| 2016/0234144 A1* | 8/2016 | Hannuksela | H04L 51/063 |
| 2016/0337671 A1 | 11/2016 | Ricard et al. | |
| 2017/0171563 A1* | 6/2017 | Deshpande | H04N 19/70 |
| 2017/0238061 A1* | 8/2017 | Deshpande | H04N 21/4852 |
| | | | 725/139 |

FOREIGN PATENT DOCUMENTS

| | | |
|---|---|---|
| EP | 2453652 A1 | 5/2012 |
| GB | 2519746 A | 5/2015 |
| WO | 2004/084523 A1 | 9/2004 |
| WO | 2011/159605 A1 | 12/2011 |

OTHER PUBLICATIONS

ITU-T, "Series H: Audiovisual and Multimedia Systems Infrastructure of audiovisual services—Coding of moving video—Advanced video coding for generic audiovisual services", Jan. 2012 (Year: 2012).*

ITU-T, "Series H: Audiovisual and Multimedia Systems Infrastructure of audiovisual services—Coding of moving video—Video coding for low bit rate communication", Jan. 2005 (Year: 2005).*

P. Amon, T. Rathgen and D. Singer, "File Format for Scalable Video Coding", IEEE transactions on circuits and systems for Video technology, vol. 17, No. 9, Sep. 2007 (Year: 2007).*

Hannuksela et al., "High Efficiency Image File Format", Jan. 2013, 12 pages.

"Information technology—MPEG systems technologies—Part 12: Image File Format", ISO/IEC JTC 1/SC 29 N, ISO/IEC CD 23008-12, Apr. 30, 2013, 55 pages.

Gellens et al., "The 'Codecs' and 'Profiles' Parameters for "Bucket" Media Types", RFC 6381, Internet Engineering Task Force (IETF), Aug. 2011, pp. 1-20.

"3rd Generation Partnership Project; Technical Specification Group Services and System Aspects; Transparent end-to-end packet switched streaming service (PSS); 3GPP file format (3GP) (Release 13)", 3GPP TS 26.244, V13.0.0, Dec. 2014, pp. 1-64.

Vadakital et al., "A Grouping Mechanism for the Image File Format (ISO/IEC 23008-12)", ISO/IEC JTC1/SC29/WG11 MPEG2015, M35825v2, Nokia, Feb. 2015, 5 pages.

(56) References Cited

OTHER PUBLICATIONS

"Draft FDIS for 23008-12 Image File Format", ISO/IEC JTC1/SC29/WG11 MPEG2015/N15234, 23008-12 Editors, Feb. 2015, 6 pages.
"HTML 5.3", W3C, Retrieved on Nov. 28, 2017, Webpage available at : http://w3c.github.io/html/.
Freed et al., "Multipurpose Internet Mail Extensions (MIME) Part Two: Media Types", RFC 2046, Network Working Group, Nov. 1996, pp. 1-36.
Hannuksela et al., "Optional MIME parameters for L-HEVC in ISO/IEC 14496-15", ISO/IEC JTC1/SC29/WG11 MPEG2015, M35833, Feb. 2015, 4 Pages.
"Advanced Video Coding for Generic Audiovisual services", Series H: Audiovisual and Multimedia Systems, Infrastructure of audiovisual services—Coding of moving Video, Recommendation ITU-T H.264, Feb. 2014, 790 pages.
"High Efficiency Video Coding", Series H: Audiovisual and Multimedia Systems, Infrastructure of audiovisual services—Coding of moving video, Recommendation ITU-T H.265, Oct. 2014, 540 pages.
Parameter Values for Ultra-High Definition Television Systems for Production and International Programme Exchange, Recommendation ITU-R BT.2020, Aug. 2012, 7 pages.
"Parameter Values for the HDTV Standards for Production and International Programme Exchange", Recommendation ITU-R BT.709, Apr. 2002, 32 pages.
"Information technology—Coding of audio-visual objects—Part 12: ISO base media file format", ISO/IEC 14496-12, Third edition, Oct. 15, 2008, 120 pages.
"Information technology—Coding ofaudio-visual objects—Part 14: MP4 file format", ISO/IEC 14496-14, First edition, Nov. 15, 2003, 18 pages.
"Information Technology—Coding of Audio-Visual Objects—Part 15: Advanced Video Coding (AVC) file format", ISO/IEC 14496-15, First edition, Apr. 15, 2004, 29 pages.
Search Report received for corresponding United Kingdom Patent Application No. 1509569.8, dated Nov. 19, 2015, 5 pages.
Search Report received for corresponding United Kingdom Patent Application No. 1509567.2, dated Nov. 25, 2015, 5 pages.
"The Metadata in JPEG Files", Exiv2, Retrieved on Dec. 5, 2017, Webpage available at : http://dev.exiv2.org/projects/exiv2/wiki/The_Metadata_in_JPEG_files.
"Responsive Image Container", GitHub, Retrieved on Dec. 5, 2017, Webpage available at : https://github.com/yoavweiss/Responsive-Image-Container/blob/master/container.md.
International Search Report and Written Opinion received for corresponding Patent Cooperation Treaty Application No. PCT/FI2016/050380, dated Aug. 30, 2016, 13 pages.
Non-Final Office action received for corresponding U.S. Appl. No. 15/576,971, dated May 29, 2018, 15 pages.
Extended European Search Report received for corresponding European Patent Application No. 16802635.9, dated Oct. 2, 2018, 9 pages.
Hannuksela et al., "Optional MIME Parameters for ISO/IEC 23008-12", ISO/IEC JTC1/SC29/WG 11 MPEG2015, M35830v2, Feb. 2015, 5 pages.
Hannuksela et al., "On Brand Specifications for the Image File Format (ISO/IEC 23008-12)", ISOIIEC JTC1/SC29/WG 11 MPEG2015, M35829, Feb. 2015, 6 pages.
Extended European Search Report received for corresponding European Patent Application No. 16802636.7, dated Jan. 3, 2019, 7 pages.
International Search Report and Written Opinion received for corresponding Patent Cooperation Treaty Application No. PCT/FI2016/050381, dated Sep. 27, 2016, 22 pages.
ISO/IEC JTC 1/SC 29 Document N14642: "Information technology—MPEG system tecnologies—Part 12: Image file format", Jul. 7-11, 2014, Sapporo, Japan 31 pages.
Office Action for U.S. Appl. No. 15/576,971 dated Jan. 3, 2019.
Office Action for U.S. Appl. No. 15/576,971 dated Jul. 25, 2019.
Text of ISO/IEC DIS 23008-12 Carriage of Still Image and Image Sequences, MPEG Meeting Jul. 7-11, 2014 (2013), 31 pages.
Office Action for Chinese Applicaticn No. 201680045219.0 dated Nov. 15, 2019, 7 pages.
Office Action for U.S. Appl. No. 15/576,971 dated Nov. 27, 2019.

* cited by examiner

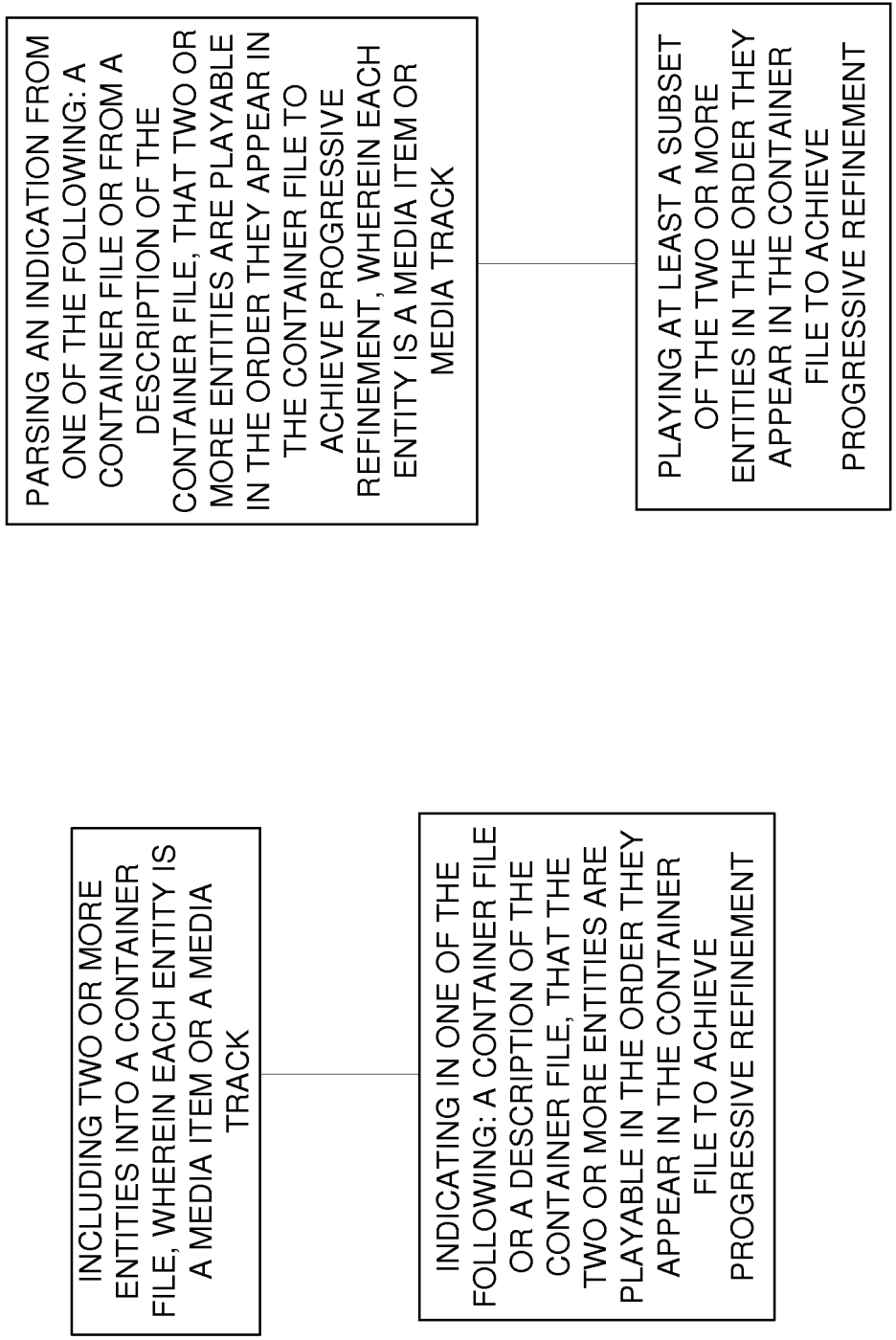

METHOD, AN APPARATUS, A COMPUTER PROGRAM FOR VIDEO CODING

RELATED APPLICATION

This application was originally filed as PCT Application No. PCT/FI2016/050381 filed May 31, 2016 which claims priority benefit from GB Patent Application No. 1509567.2, filed Jun. 3, 2015.

TECHNICAL FIELD

The present application relates to progressive refinement indication for image container files.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

High Efficiency Image File Format (HEIF) is a standard developed by the Moving Picture Experts Group (MPEG) for storage of images and image sequences. The standard facilitates file encapsulation of data coded according to High Efficiency Video Coding (HEVC) standard. HEIF includes features building on top of the used ISO Base Media File Format (ISOBMFF).

SUMMARY

Some embodiments provide a method for encoding and decoding video information.

Various aspects of examples of the invention are provided in the detailed description.

According to a first aspect, there is provided a method comprising: including two or more entities into a container file, wherein each entity is a media item or a media track; and indicating in one of the following: the container file or a description of the container file; that the two or more entities are playable in the order they appear in the container file to achieve progressive refinement.

According to a second aspect, there is provided an apparatus comprising at least one processor, memory including computer program code, the memory and the computer program code configure to, with the at least one processor, cause the apparatus to perform at least the following: to include two or more entities into a container file, wherein each entity is a media item or a media track; and to indicate in one of the following: the container file or a description of the container file; that the two or more entities are playable in the order they appear in the container file to achieve progressive refinement.

According to a third aspect, there is provided an apparatus comprising at least processing means and memory means, and further comprising: means for including two or more entities into a container file, wherein each entity is a media item or a media track; and means for indicating in one of the following: the container file or a description of the container file; that the two or more entities are playable in the order they appear in the container file to achieve progressive refinement.

According to a fourth aspect, there is provided a computer program product embodied on a non-transitory computer readable medium, comprising computer program code configured to, when executed on at least one processor, cause an apparatus or a system to: include two or more entities into a container file, wherein each entity is a media item or a media track; and indicate in one of the following: the container file or a description of the container file; that the two or more entities are playable in the order they appear in the container file to achieve progressive refinement.

According to an embodiment, it is indicated in the container file, that an alternate group comprises the two or more entities.

According to an embodiment, it is indicated in a container file one or more playback modes for the two or more entities.

According to an embodiment, said two or more entities is one of the following: a thumbnail image and a respective master image; a cover image and a timed image sequence; a thumbnail image for a cover image, the cover image and the timed image sequence; images representing a same original image, but having different characteristics; scalably coded images representing a same original image, but having different characteristics, images representing different view of a same content.

According to an embodiment the method further comprises selecting the two or more entities based on a pre-defined playback mode, the pre-defined playback mode being one of the following: cover content playback mode; image sequence preview mode; a gallery refinement mode.

According to a fifth aspect, there is provided a method comprising parsing an indication from one of the following: a container file or from a description of the container file; that two or more entities are playable in the order they appear in the container file to achieve progressive refinement, wherein each entity is a media item or a media track; and playing at least a subset of the two or more entities in the order they appear in the container file to achieve progressive refinement.

According to a sixth aspect, there is provided an apparatus comprising at least one processor, memory including computer program code, the memory and the computer program code configure to, with the at least one processor, cause the apparatus to perform at least the following: to parse an indication from one of the following: a container file or from a description of the container file; that two or more entities are playable in the order they appear in the container file to achieve progressive refinement, wherein each entity is a media item or a media track; to play at least a subset of the two or more entities in the order they appear in the container file to achieve progressive refinement.

According to a seventh aspect, there is provided an apparatus comprising at least processing means and memory means, and further comprising: means for parsing an indication from one of the following: a container file or from a description of the container file; that two or more entities are playable in the order they appear in the container file to achieve progressive refinement, wherein each entity is a media item or a media track; and means for playing at least a subset of the two or more entities in the order they appear in the container file to achieve progressive refinement.

According to an eighth aspect, there is provided a computer program product embodied on a non-transitory computer readable medium, comprising computer program code configured to, when executed on at least one processor, cause an apparatus or a system to: parse an indication from one of the following: a container file or from a description of the container file; that two or more entities are playable in the order they appear in the container file to achieve progressive refinement, wherein each entity is a media item or a media track; and play at least a subset of the two or more entities in the order they appear in the container file to achieve progressive refinement.

According to an embodiment, an indication is parsed from the container file, that an alternate group comprises the two or more entities.

According to an embodiment, the method comprising parsing from the container file, an indication on one or more playback modes for the two or more entities.

According to an embodiment said two or more entities is one of the following: a thumbnail image and a respective master image; a cover image and a timed image sequence; a thumbnail image for a cover image, the cover image and the timed image sequence; images representing a same original image, but having different characteristics; scalably coded images representing a same original image, but having different characteristics, images representing different view of a same content.

BRIEF DESCRIPTION OF THE DRAWINGS

For a more complete understanding of example embodiments of the present invention, reference is now made to the following descriptions taken in connection with the accompanying drawings in which:

FIG. 8 is a flowchart illustrating an embodiment of a method; and

FIG. 9 is a flowchart illustrating another embodiment of a method.

DETAILED DESCRIPTION OF SOME EXAMPLE EMBODIMENTS

The present application relates to video related business including creation, delivery and playback of image and image sequence data. Video codecs are nowadays an integral part of many consumer devices, e.g. high-end smartphones, digital still cameras, and television sets, and may therefore be used for coding and decoding of individual images and image sequences, such as photo bursts.

Figure 2:
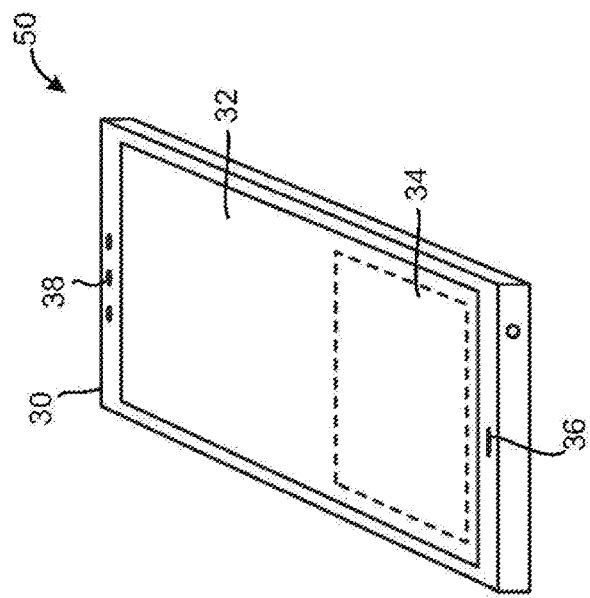
FIG. 2 illustrates a layout of an apparatus according to an embodiment.
Figure 1:
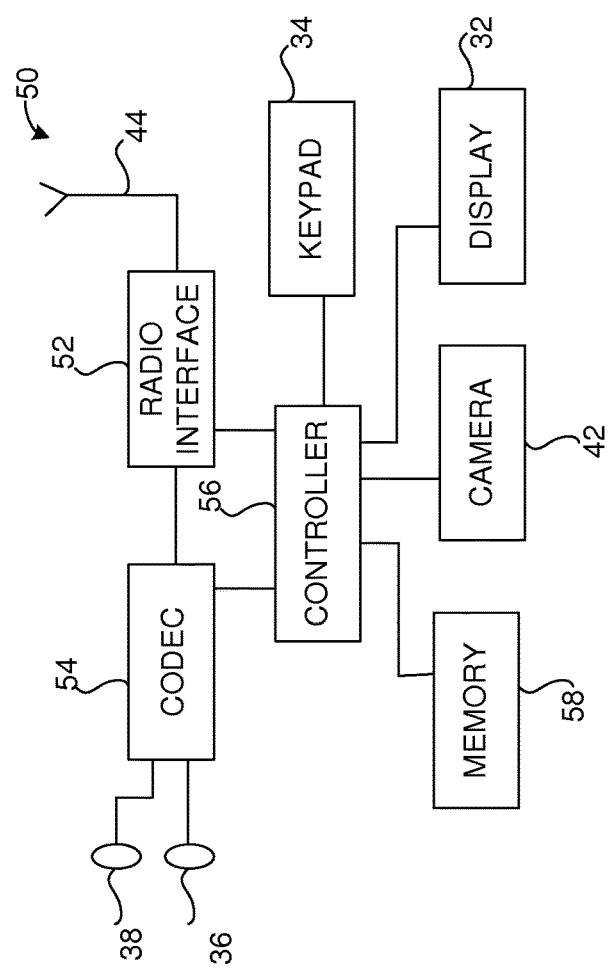
FIG. 1 illustrates a block diagram of a video coding system according to an embodiment.

An embodiment of such consumer device is illustrated in FIGS. 1 and 2. The apparatus 50 is an electronic device for example a mobile terminal or a user equipment of a wireless communication system or a camera device. The apparatus 50 may comprise a housing 30 for incorporating and protecting the device. The apparatus 50 further may comprise a display 32, for example, a liquid crystal display or any other display technology capable of displaying images and/or videos. The apparatus 50 may further comprise a keypad 34. According to another embodiment, any suitable data or user interface mechanism may be employed. For example, the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device, which may be any of the following: an earpiece 38, a speaker or an analogue audio or digital audio output connection. The apparatus 50 may also comprise a battery (according to another embodiment, the device may be powered by any suitable mobile energy device, such as solar cell, fuel cell or clockwork generator). The apparatus may comprise a camera 42 capable of recording or capturing images and/or video, or may be connected to one. According to an embodiment, the apparatus 50 may further comprise an infrared port for short range line of sight communication to other devices. According to an embodiment, the apparatus 50 may further comprise any suitable short range communication solution such as for example a Bluetooth wireless connection or a USB/firewire wired solution.

The apparatus 50 may comprise a controller 56 or processor for controlling the apparatus. The controller 56 may be connected to memory 58 which, according to an embodiment, may store both data in the form of image and audio data and/or may also store instructions for implementation on the controller 56. The controller 56 may further be connected to video codec circuitry 54 suitable for carrying out coding and decoding or audio and/or video data or assisting in encoding and/or decoding carried out by the controller 56.

Figure 4:
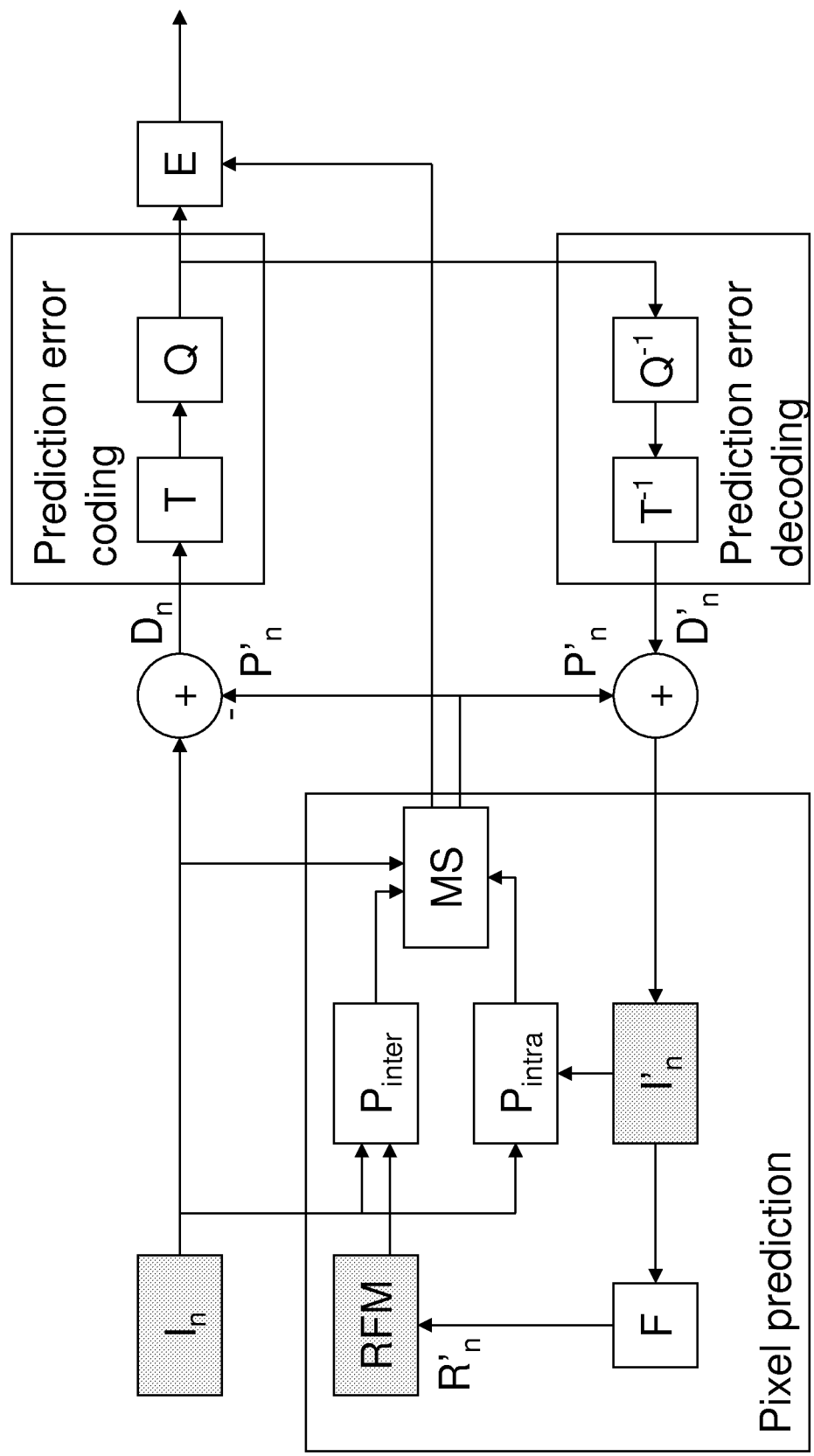
FIG. 4 illustrates a block diagram of a video encoder according to an embodiment.
Figure 5:
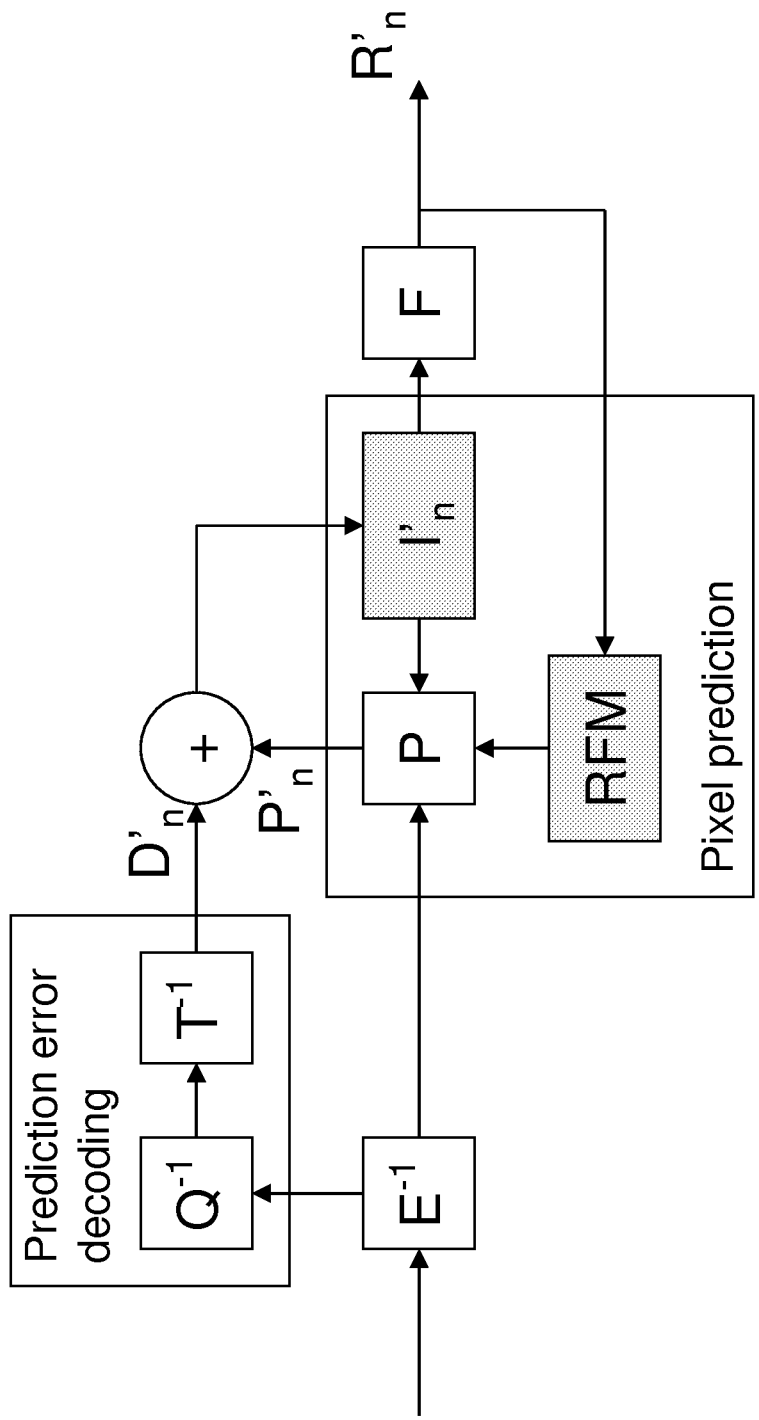
FIG. 5 illustrates a block diagram of a video decoder according to an embodiment.

A video codec circuitry 54 may comprise an encoder that transforms the input video into a compressed representation suited for storage/transmission, and a decoder is able to uncompress the compressed video representation back into a viewable form. The encoder may discard some information in the original video sequence in order to represent the video in more compact form (i.e. at lower bitrate). FIG. 4 illustrates an example of a video encoder, where $I_n$: Image to be encoded; $P'_n$: Predicted representation of an image block; $D_n$: Prediction error signal; $D'_n$: Reconstructed prediction error signal; $I'_n$: Preliminary reconstructed image; $R'_n$: Final reconstructed image; T, $T^{-1}$: Transform and inverse transform; Q, $Q^{-1}$: Quantization and inverse quantization; E: Entropy encoding; RFM: Reference frame memory; $P_{inter}$: Inter prediction; $P_{intra}$: Intra prediction; MS: Mode selection; F: Filtering. FIG. 5 illustrates a block diagram of a video decoder where $P'_n$: Predicted representation of an image block; $D'_n$: Reconstructed prediction error signal; $I'_n$: Preliminary reconstructed image; $R'_n$: Final reconstructed image; $T^{-1}$: Inverse transform; $Q^{-1}$: Inverse quantization; $E^{-1}$: Entropy decoding; RFM: Reference frame memory; P: Prediction (either inter or intra); F: Filtering. In some embodiments, the apparatus 50 (FIGS. 1 and 2) comprises only an encoder or a decoder, is some other embodiments the apparatus 50 comprises both.

Referring again to FIGS. 1 and 2. The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

According to an embodiment, the apparatus 50 comprises a camera 42 capable of recording or detecting individual frames which are then passed to the codec 54 or controller for processing. According to an embodiment, the apparatus may receive the video image data for processing from another device prior to transmission and/or storage. According to an embodiment, the apparatus 50 may receive the images for processing either wirelessly or by a wired connection.

Figure 3:
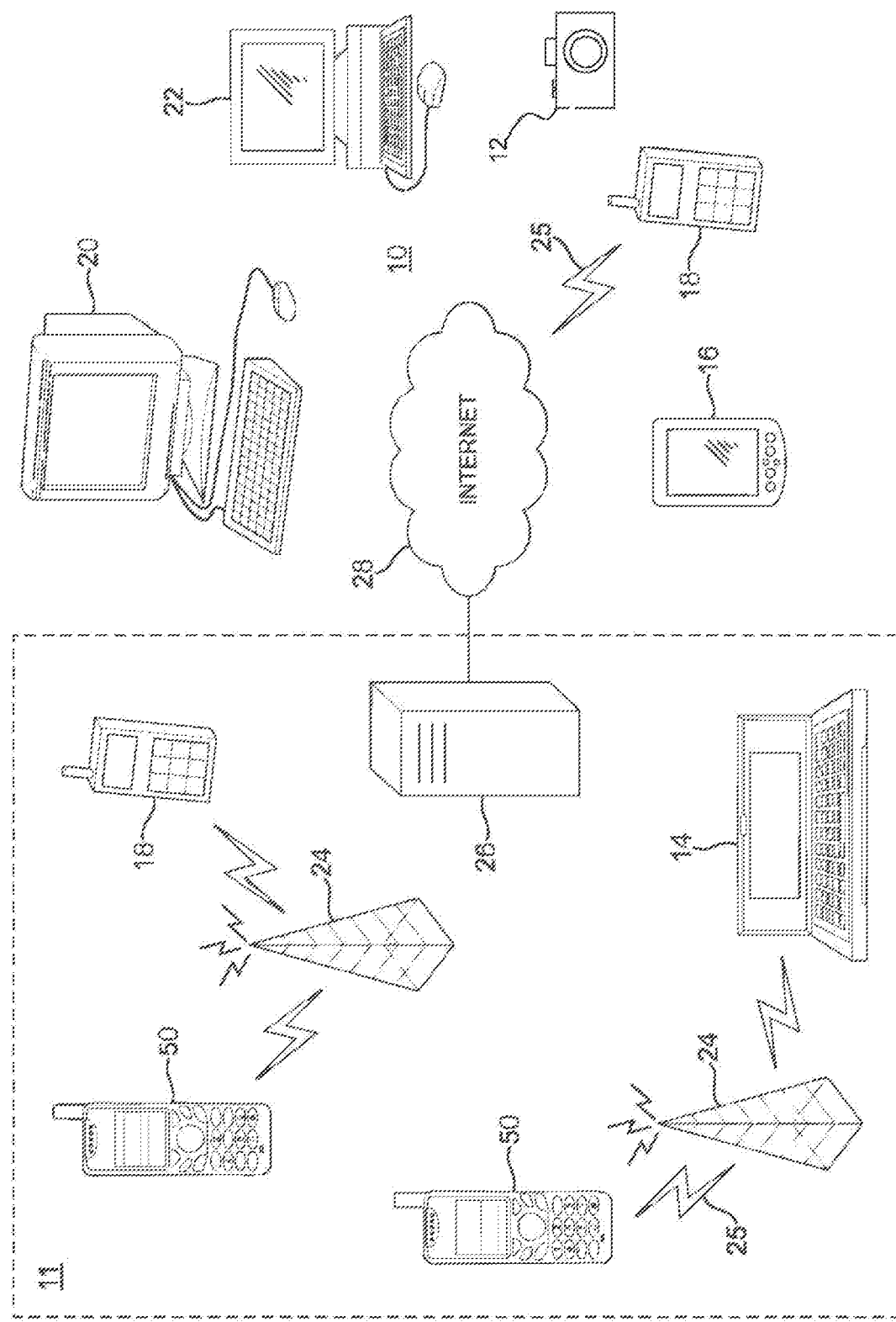
FIG. 3 illustrates an arrangement for video coding comprising a plurality of apparatuses, networks and network elements according to an example embodiment.

FIG. 3 shows a system configuration comprising a plurality of apparatuses, networks and network elements according to an embodiment. The system 10 comprises multiple communication devices which can communicate through one or more networks. The system 10 may comprise any combination of wired or wireless networks including, but not limited to a wireless cellular telephone network (such as a GSM, UMTS, CDMA network, etc.), a wireless local area network (WLAN), such as defined by any of the IEEE 802.x standards, a Bluetooth personal area network, an Ethernet local area network, a token ring local area network, a wide area network, and the internet.

The system 10 may include both wired and wireless communication devices or apparatus 50 suitable for implementing present embodiments. For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include but are not limited to, an electronic device or apparatus 50, a combination of a personal digital assistant (PDA) and a mobile telephone 14, a PDA 16, an integrated messaging device (IMD) 18, a desktop computer 20, a notebook computer 22, a digital camera 12. The apparatus 50 may be stationary or mobile when carried by an individual who is moving. The apparatus 50 may also be located in a mode of transport.

Some of further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telephone system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio infrared, laser, cable connections or any suitable connection.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, integrating new extensions or features to the specification. These extensions include Scalable Video Coding (SVC) and Multiview Video Coding (MVC).

Version 1 of the High Efficiency Video Coding (H.265/HEVC a.k.a. HEVC) standard was developed by the Joint Collaborative Team-Video Coding (JCT-VC) of VCEG and MPEG. The standard was published by both parent standardization organizations, and it is referred to as ITU-T Recommendation H.265 and ISO/IEC International Standard 23008-2, also known as MPEG-H Part 2 High Efficiency Video Coding (HEVC). Version 2 of H.265/HEVC included scalable, multiview, and fidelity range extensions, which may be abbreviated SHVC, MV-HEVC, and REXT, respectively. Version 2 of H.265/HEVC was published as ITU-T Recommendation H.265 (10/2014) and as Edition 2 of ISO/IEC 23008-2. There are currently ongoing standardization projects to develop further extensions to H.265/HEVC, including three-dimensional and screen content coding extensions, which may be abbreviated 3D-HEVC and SCC, respectively.

SHVC, MV-HEVC, and 3D-HEVC use a common basis specification, specified in Annex F of the version 2 of the HEVC standard. This common basis comprises for example high-level syntax and semantics e.g. specifying some of the characteristics of the layers of the bitstream, such as inter-layer dependencies, as well as decoding processes, such as reference picture list construction including inter-layer reference pictures and picture order count derivation for multi-layer bitstream. Annex F may also be used in potential subsequent multi-layer extensions of HEVC. It is to be understood that even though a video encoder, a video decoder, encoding methods, decoding methods, bitstream structures, and/or embodiments may be described in the following with reference to specific extensions, such as SHVC and/or MV-HEVC, they are generally applicable to any multi-layer extensions of HEVC, and even more generally to any multi-layer video coding scheme.

Some key definitions, bitstream and coding structures, and concepts of are described in this section as an example of encoder, decoder, encoding method, decoding method, and a bitstream structure for pictures and picture sequences, wherein the embodiments may be implemented. The aspects of the invention are not limited to HEVC, but rather the description is given for one possible basis on top of which the invention may be partly or fully realized.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoder conformance can be verified with the Hypothetical Reference Decoder (HRD). The standards contain coding tools that help in coping with transmission errors and losses, but the use of the tools in encoding is optional and no decoding process has been specified for erroneous bitstreams.

In the description of existing standards as well as in the description of example embodiments, a syntax element may be defined as an element of data represented in the bitstream. A syntax structure may be defined as zero or more syntax elements present together in the bitstream in a specified order. In the description of existing standards as well as in the description of example embodiments, a phrase "by external means" or "through external means" may be used. For example, an entity, such as a syntax structure or a value of a variable used in the decoding process, may be provided "by external means" to the decoding process. The phrase "by external means" may indicate that the entity is not included in the bitstream created by the encoder, but rather conveyed externally from the bitstream for example using a control protocol. It may alternatively or additionally mean that the entity is not created by the encoder, but may be created for example in the player or decoding control logic or alike that is using the decoder. The decoder may have an interface for inputting the external means, such as variable values.

The elementary unit for the input to an H.264/AVC or HEVC encoder and the output of an H.264/AVC or HEVC decoder, respectively, is a picture. A picture given as an input to an encoder may also be referred to as a source picture, and a picture decoded by a decoded may be referred to as a decoded picture.

The source and decoded pictures are each comprised of one or more sample arrays, such as one of the following sets of sample arrays:

Luma (Y) only (monochrome).
Luma and two chroma (YCbCr or YCgCo).
Green, Blue and Red (GBR, also known as RGB).
Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr; regardless of the actual color representation method in use. The actual color representation method in use can be indicated e.g. in a coded bitstream e.g. using the Video Usability Information (VUI) syntax of H.264/AVC and/or HEVC. A component may be defined as an array or single sample from one of the three sample arrays arrays (luma and two chroma) or the array or a single sample of the array that compose a picture in monochrome format.

In H.264/AVC and HEVC, a picture may either be a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays. Chroma formats may be summarized as follows:

In monochrome sampling there is only one sample array, which may be nominally considered the luma array.
In 4:2:0 sampling, each of the two chroma arrays has half the height and half the width of the luma array.
In 4:2:2 sampling, each of the two chroma arrays has the same height and half the width of the luma array.
In 4:4:4 sampling when no separate color planes are in use, each of the two chroma arrays has the same height and width as the luma array.

In H.264/AVC and HEVC, it is possible to code sample arrays as separate color planes into the bitstream and respectively decode separately coded color planes from the bitstream. When separate color planes are in use, each one of them is separately processed (by the encoder and/or the decoder) as a picture with monochrome sampling.

An elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures. A NAL unit may be defined as a syntax structure containing an indication of the type of data to follow and bytes containing that data in the form of an RBSP interspersed as necessary with startcode emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0. NAL units consist of a header and payload.

In HEVC, a two-byte NAL unit header is used for all specified NAL unit types. The NAL unit header contains one reserved bit, a six-bit NAL unit type indication, a three-bit nuh_temporal_id_plus1 indication for temporal level (may be required to be greater than or equal to 1) and a six-bit nuh_layer_id syntax element. The temporal_id_plus1 syntax element may be regarded as a temporal identifier for the NAL unit, and a zero-based TemporalId variable may be derived as follows: TemporalId=temporal_id_plus1−1. TemporalId equal to 0 corresponds to the lowest temporal level. The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to TID does not use any picture having a TemporalId greater than TID as inter prediction reference. A sub-layer or a temporal sub-layer may be defined to be a temporal scalable layer of a temporal scalable bitstream, consisting of VCL NAL units with a particular value of the TemporalId variable and the associated non-VCL NAL units. nuh_layer_id can be understood as a scalability layer identifier.

Scalable video coding may refer to coding structure where one bitstream can contain multiple representations of the content, for example, at different bitrates, resolutions or frame rates. In these cases the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A meaningful decoded representation can be produced by decoding only certain parts of a scalable bit stream. A scalable bitstream typically consists of a "base layer" providing the lowest quality video available and one or more enhancement layers that enhance the video quality when received and decoded together with the lower layers. In order to improve coding efficiency for the enhancement layers, the coded representation of that layer typically depends on the lower layers. E.g. the motion and mode information of the enhancement layer can be predicted from lower layers. Similarly the pixel data of the lower layers can be used to create prediction for the enhancement layer.

In some scalable video coding schemes, a video signal can be encoded into a base layer and one or more enhancement layers. An enhancement layer may enhance, for example, the temporal resolution (i.e., the frame rate), the spatial resolution, or simply the quality of the video content represented by another layer or part thereof. Each layer together with all its dependent layers is one representation of the video signal, for example, at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

Scalability modes or scalability dimensions may include but are not limited to the following:

Quality scalability: Base layer pictures are coded at a lower quality than enhancement layer pictures, which may be achieved for example using a greater quantization parameter value (i.e., a greater quantization step size for transform coefficient quantization) in the base layer than in the enhancement layer.

Spatial scalability: Base layer pictures are coded at a lower resolution (i.e. have fewer samples) than enhancement layer pictures. Spatial scalability and quality scalability, particularly its coarse-grain scalability type, may sometimes be considered the same type of scalability.

Bit-depth scalability: Base layer pictures are coded at lower bit-depth (e.g. 8 bits) than enhancement layer pictures (e.g. 10 or 12 bits).

Dynamic range scalability: Scalable layers represent a different dynamic range and/or images obtained using a different tone mapping function and/or a different optical transfer function.

Chroma format scalability: Base layer pictures provide lower spatial resolution in chroma sample arrays (e.g. coded in 4:2:0 chroma format) than enhancement layer pictures (e.g. 4:4:4 format).

Color gamut scalability: enhancement layer pictures have a richer/broader color representation range than that of the base layer pictures—for example the enhancement layer may have UHDTV (ITU-R BT.2020) color gamut and the base layer may have the ITU-R BT.709 color gamut.

View scalability, which may also be referred to as multiview coding. The base layer represents a first view, whereas an enhancement layer represents a second view.

Depth scalability, which may also be referred to as depth-enhanced coding. A layer or some layers of a bitstream may represent texture view(s), while other layer or layers may represent depth view(s).

Region-of-interest scalability (as described below).

Interlaced-to-progressive scalability (also known as field-to-frame scalability): coded interlaced source content material of the base layer is enhanced with an enhancement layer to represent progressive source content.

Hybrid codec scalability (also known as coding standard scalability): In hybrid codec scalability, the bitstream syntax, semantics and decoding process of the base layer and the enhancement layer are specified in different video coding standards. Thus, base layer pictures are coded according to a different coding standard or format than enhancement layer pictures. For example, the base layer may be coded with H.264/AVC and an enhancement layer may be coded with an HEVC multi-layer extension.

It should be understood that many of the scalability types may be combined and applied together. For example color gamut scalability and bit-depth scalability may be combined.

The term layer may be used in context of any type of scalability, including view scalability and depth enhancements. An enhancement layer may refer to any type of an enhancement, such as SNR, spatial, multiview, depth, bit-depth, chroma format, and/or color gamut enhancement. A base layer may refer to any type of a base video sequence, such as a base view, a base layer for SNR/spatial scalability, or a texture base view for depth-enhanced video coding.

Various technologies for providing three-dimensional (3D) video content are currently investigated and developed. It may be considered that in stereoscopic or two-view video, one video sequence or view is presented for the left eye while a parallel view is presented for the right eye. More than two parallel views may be needed for applications which enable viewpoint switching or for autostereoscopic displays which may present a large number of views simultaneously and let the viewers to observe the content from different viewpoints.

A view may be defined as a sequence of pictures representing one camera or viewpoint. The pictures representing a view may also be called view components. In other words, a view component may be defined as a coded representation of a view in a single access unit. In multiview video coding, more than one view is coded in a bitstream. Since views are typically intended to be displayed on stereoscopic or multiview autostrereoscopic display or to be used for other 3D arrangements, they typically represent the same scene and are content-wise partly overlapping although representing different viewpoints to the content. Hence, inter-view prediction may be utilized in multiview video coding to take advantage of inter-view correlation and improve compression efficiency. One way to realize inter-view prediction is to include one or more decoded pictures of one or more other views in the reference picture list(s) of a picture being coded or decoded residing within a first view. View scalability may refer to such multiview video coding or multiview video bitstreams, which enable removal or omission of one or more coded views, while the resulting bitstream remains conforming and represents video with a smaller number of views than originally. Region of Interest (ROI) coding may be defined to refer to coding a particular region within a video at a higher fidelity.

ROI scalability may be defined as a type of scalability wherein an enhancement layer enhances only part of a reference-layer picture e.g. spatially, quality-wise, in bit-depth, and/or along other scalability dimensions. As ROI scalability may be used together with other types of scalabilities, it may be considered to form a different categorization of scalability types. There exists several different applications for ROI coding with different requirements, which may be realized by using ROI scalability. For example, an enhancement layer can be transmitted to enhance the quality and/or a resolution of a region in the base layer. A decoder receiving both enhancement and base layer bitstream might decode both layers and overlay the decoded pictures on top of each other and display the final picture.

The spatial correspondence of a reference-layer picture and an enhancement-layer picture may be inferred or may be indicated with one or more types of so-called reference layer location offsets. In HEVC, reference layer location offsets may be included in the picture parameter set (PPS) NAL unit by the encoder and decoded from the PPS by the decoder.

Reference layer location offsets may be used for but are not limited to achieving ROI scalability. Reference layer location offsets may comprise one or more of scaled reference layer offsets, reference region offsets, and resampling phase sets. Scaled reference layer offsets may be considered to specify the horizontal and vertical offsets between the sample in the current picture that is collocated with the top-left luma sample of the reference region in a decoded picture in a reference layer and the horizontal and vertical offsets between the sample in the current picture that is collocated with the bottom-right luma sample of the reference region in a decoded picture in a reference layer. Another way is to consider scaled reference layer offsets to specify the positions of the corner samples of the upsampled reference region relative to the respective corner samples of the enhancement layer picture. The scaled reference layer offset values may be signed. Reference region offsets may be considered to specify the horizontal and vertical offsets between the top-left luma sample of the reference region in the decoded picture in a reference layer and the top-left luma sample of the same decoded picture as well as the horizontal and vertical offsets between the bottom-right luma sample of the reference region in the decoded picture in a reference layer and the bottom-right luma sample of the same decoded picture. The reference region offset values may be signed. A resampling phase set may be considered to specify the phase offsets used in resampling process of a source picture for inter-layer prediction. Different phase offsets may be provided for luma and chroma components.

A scalable video encoder for quality scalability (also known as Signal-to-Noise or SNR) and/or spatial scalability may be implemented as follows. For a base layer, a conventional non-scalable video encoder and decoder may be used. The reconstructed/decoded pictures of the base layer are included in the reference picture buffer and/or reference picture lists for an enhancement layer. In case of spatial scalability, the reconstructed/decoded base-layer picture may be upsampled prior to its insertion into the reference picture lists for an enhancement-layer picture. The base layer decoded pictures may be inserted into a reference picture list(s) for coding/decoding of an enhancement layer picture similarly to the decoded reference pictures of the enhancement layer. Consequently, the encoder may choose a base-layer reference picture as an inter prediction reference and indicate its use with a reference picture index in the coded bitstream. The decoder decodes from the bitstream, for example from a reference picture index, that a base-layer picture is used as an inter prediction reference for the enhancement layer. When a decoded base-layer picture is used as the prediction reference for an enhancement layer, it is referred to as an inter-layer reference picture.

While the previous paragraph described a scalable video codec with two scalability layers with an enhancement layer and a base layer, it needs to be understood that the description can be generalized to any two layers in a scalability hierarchy with more than two layers. In this case, a second enhancement layer may depend on a first enhancement layer in encoding and/or decoding processes, and the first enhancement layer may therefore be regarded as the base layer for the encoding and/or decoding of the second enhancement layer. Furthermore, it needs to be understood that there may be inter-layer reference pictures from more than one layer in a reference picture buffer or reference picture lists of an enhancement layer, and each of these inter-layer reference pictures may be considered to reside in a base layer or a reference layer for the enhancement layer being encoded and/or decoded. Furthermore, it needs to be understood that other types of inter-layer processing than reference-layer picture upsampling may take place instead or additionally. For example, the bit-depth of the samples of the reference-layer picture may be converted to the bit-depth of the enhancement layer and/or the sample values may undergo a mapping from the color space of the reference layer to the color space of the enhancement layer.

A scalable video coding and/or decoding scheme may use multi-loop coding and/or decoding, which may be characterized as follows. In the encoding/decoding, a base layer picture may be reconstructed/decoded to be used as a motion-compensation reference picture for subsequent pictures, in coding/decoding order, within the same layer or as a reference for inter-layer (or inter-view or inter-component) prediction. The reconstructed/decoded base layer picture may be stored in a decoded picture buffer (DPB). An enhancement layer picture may likewise be reconstructed/decoded to be used as a motion-compensation reference picture for subsequent pictures, in coding/decoding order, within the same layer or as reference for inter-layer (or inter-view or inter-component) prediction for higher enhancement layers, if any. In addition to reconstructed/decoded sample values, syntax element values of the base/reference layer or variables derived from the syntax element values of the base/reference layer may be used in the inter-layer/inter-component/inter-view prediction.

Inter-layer prediction may be defined as prediction in a manner that is dependent on data elements (e.g., sample values or motion vectors) of reference pictures from a different layer than the layer of the current picture (being encoded or decoded). Many types of inter-layer prediction exist and may be applied in a scalable video encoder/decoder. The available types of inter-layer prediction may for example depend on the coding profile according to which the bitstream or a particular layer within the bitstream is being encoded or, when decoding, the coding profile that the bitstream or a particular layer within the bitstream is indicated to conform to. Alternatively or additionally, the available types of inter-layer prediction may depend on the types of scalability or the type of an scalable codec or video coding standard amendment (e.g. SHVC, MV-HEVC, or 3D-HEVC) being used.

The types of inter-layer prediction may comprise, but are not limited to, one or more of the following: inter-layer sample prediction, inter-layer motion prediction, inter-layer residual prediction. In inter-layer sample prediction, at least a subset of the reconstructed sample values of a source picture for inter-layer prediction are used as a reference for predicting sample values of the current picture. In inter-layer motion prediction, at least a subset of the motion vectors of a source picture for inter-layer prediction are used as a reference for predicting motion vectors of the current picture. Typically, predicting information on which reference pictures are associated with the motion vectors is also included in inter-layer motion prediction. For example, the reference indices of reference pictures for the motion vectors may be inter-layer predicted and/or the picture order count or any other identification of a reference picture may be inter-layer predicted. In some cases, inter-layer motion prediction may also comprise prediction of block coding mode, header information, block partitioning, and/or other similar parameters. In some cases, coding parameter prediction, such as inter-layer prediction of block partitioning, may be regarded as another type of inter-layer prediction. In inter-layer residual prediction, the prediction error or residual of selected blocks of a source picture for inter-layer prediction is used for predicting the current picture. In multiview-plusdepth coding, such as 3D-HEVC, cross-component inter-layer prediction may be applied, in which a picture of a first type, such as a depth picture, may affect the inter-layer prediction of a picture of a second type, such as a conventional texture picture. For example, disparity-compensated inter-layer sample value and/or motion prediction may be applied, where the disparity may be at least partially derived from a depth picture.

A direct reference layer may be defined as a layer that may be used for inter-layer prediction of another layer for which the layer is the direct reference layer. A direct predicted layer may be defined as a layer for which another layer is a direct reference layer. An indirect reference layer may be defined as a layer that is not a direct reference layer of a second layer but is a direct reference layer of a third layer that is a direct reference layer or indirect reference layer of a direct reference layer of the second layer for which the layer is the indirect reference layer. An indirect predicted layer may be defined as a layer for which another layer is an indirect reference layer. An independent layer may be defined as a layer that does not have direct reference layers. In other words, an independent layer is not predicted using inter-layer prediction. A non-base layer may be defined as any other layer than the base layer, and the base layer may be defined as the lowest layer in the bitstream. An independent non-base layer may be defined as a layer that is both an independent layer and a non-base layer.

A coding standard or system may refer to a term operation point or alike, which may indicate the scalable layers and/or sub-layers under which the decoding operates and/or may be associated with a sub-bitstream that includes the scalable layers and/or sub-layers being decoded. In HEVC, an operation point is defined as bitstream created from another bitstream by operation of the sub-bitstream extraction process with the another bitstream, a target highest TemporalId, and a target layer identifier list as inputs.

The video parameter set (VPS) NAL unit of HEVC specifies layer sets and HRD parameters for these layer sets. A layer set may be used as the target layer identifier list in the sub-bitstream extraction process. In HEVC, a layer set may be defined as set of layers represented within a bitstream created from another bitstream by operation of the sub-bitstream extraction process with the another bitstream, the target highest TemporalId equal to 6, and the target layer identifier list equal to the layer identifier list associated with the layer set as inputs.

An output layer may be defined as a layer whose decoded pictures are output by the decoding process. The output layers may depend on which subset of the multi-layer bitstream is decoded. The pictures output by the decoding process may be further processed, e.g. a color space conversion from the YUV color space to RGB may be performed, and they may be displayed. However, further processing and/or displaying may be considered to be processes external of the decoder and/or the decoding process and might not take place.

In multi-layer video bitstreams, an operation point definition may include a consideration a target output layer set. For example, an operation point may be defined as a bitstream that is created from another bitstream by operation of the sub-bitstream extraction process with the another bitstream, a target highest temporal sub-layer (e.g. a target highest TemporalId), and a target layer identifier list as inputs, and that is associated with a set of output layers. Alternatively, another term, such as an output operation point, may be used when referring to an operation point and the associated set of output layers. For example, in MV-HEVC/SHVC, an output operation point may be defined as a bitstream that is created from an input bitstream by operation of the sub-bitstream extraction process with the input bitstream, a target highest TemporalId, and a target layer identifier list as inputs, and that is associated with a set of output layers.

An output layer set (OLS) may be defined as a set of layers consisting of the layers of one of the specified layer sets, where one or more layers in the set of layers are indicated to be output layers. An output layer may be defined as a layer of an output layer set that is output when the decoder and/or the HRD operates using the output layer set as the target output layer set. In MV-HEVC/SHVC, the variable TargetOlsIdx may specify which output layer set is the target output layer set by setting TargetOlsIdx equal to the index of the output layer set that is the target output layer set. A target output layer set may be defined as the output layer set for which the index is equal to TargetOlsIdx. TargetOlsIdx may be set for example by the HRD and/or may be set by external means, for example by a player or alike through an interface provided by the decoder. In MV-HEVC/SHVC, an output layer may be defined as a layer of an output layer set that is output when TargetOlsIdx is equal to the index of the output layer set.

A profile may be defined as a subset of the entire bitstream syntax that is specified by a decoding/coding standard or specification. Within the bounds imposed by the syntax of a given profile it is still possible to require a very large variation in the performance of encoders and decoders depending upon the values taken by syntax elements in the bitstream such as the specified size of the decoded pictures. In many applications, it might be neither practical nor economic to implement a decoder capable of dealing with all hypothetical uses of the syntax within a particular profile. In order to deal with this issue, levels may be used. A level may be defined as a specified set of constraints imposed on values of the syntax elements in the bitstream and variables specified in a decoding/coding standard or specification. These constraints may be simple limits on values. Alternatively or in addition, they may take the form of constraints on arithmetic combinations of values (e.g., picture width multiplied by picture height multiplied by number of pictures decoded per second). Other means for specifying constraints for levels may also be used. Some of the constraints specified in a level may for example relate to the maximum picture size, maximum bitrate and maximum data rate in terms of coding units, such as macroblocks, per a time period, such as a second. The same set of levels may be defined for all profiles. It may be preferable for example to increase interoperability of terminals implementing different profiles that most or all aspects of the definition of each level may be common across different profiles. A tier may be defined as specified category of level constraints imposed on values of the syntax elements in the bitstream, where the level constraints are nested within a tier and a decoder conforming to a certain tier and level would be capable of decoding all bitstreams that conform to the same tier or the lower tier of that level or any level below it.

In some cases, a conformance point may be defined as a combination of a particular profile and a particular level or a combination of a particular profile, a particular tier, and a particular level. It needs to be understood that a conformance point may be defined in alternative ways, while its intent to specify characteristics and limits of bitstream and/or characteristics and (maximum) resources of decoders may be kept unchanged.

In the multi-layer HEVC extensions, a profile-tier-level combination is indicated for each necessary layer for each output layer set. A necessary layer may be defined as a layer in an output operation point associated with an output layer set, the layer being an output layer of the output layer set, or a reference layer of an output layer of the output layer set. For the multi-layer HEVC extensions, a conformance point may be defined as a list of profile-tier-level combinations, where the list includes the profile-tier-level combination for each necessary layer of a particular output layer set. Different profile-tier-level value (particularly different level value) can be indicated for the same layer in different output layer sets, as the decoded picture buffer requirements differ depending on which layers are necessary layers and which layers are output layers, and the decoded picture buffer requirements are part of the level specifications. Decoder capabilities can be indicated as a list of profile-tier-level combinations. For these mentioned reasons, a single profile-tier-level value within a codecs MIME parameter might not be sufficient to describe a multi-layer HEVC bitstream stored e.g. in an ISOBMFF compliant file.

A uniform resource identifier (URI) may be defined as a string of characters used to identify a name of a resource. Such identification enables interaction with representations of the resource over a network, using specific protocols. A URI is defined through a scheme specifying a concrete syntax and associated protocol for the URI. The uniform resource locator (URL) and the uniform resource name (URN) are forms of URI. A URL may be defined as a URI that identifies a web resource and specifies the means of acting upon or obtaining the representation of the resource, specifying both its primary access mechanism and network location. A URN may be defined as a URI that identifies a resource by name in a particular namespace. A URN may be used for identifying a resource without implying its location or how to access it.

Available media file format standards include ISO base media file format (ISO/IEC 14496-12, which may be abbreviated ISOBMFF) as well as standards derived from the ISOBMFF, such as MPEG-4 file format (ISO/IEC 14496-14, also known as the MP4 format), file format for NAL unit structured video (ISO/IEC 14496-15) and 3GPP file format (3GPP TS 26.244, also known as the 3GP format). ISO/IEC 14496-15 specifies the storage of bitstreams of the Advanced Video Coding standard (H.264/AVC) and/or the High Efficiency Video Coding standard (HEVC) and/or their extensions in ISOBMFF compliant files.

Some concepts, structures, and specifications of ISOBMFF are described below as an example of a container file format, based on which the embodiments may be implemented. The aspects of the invention are not limited to ISOBMFF, but rather the description is given for one possible basis on top of which the invention may be partly or fully realized.

One building block in the ISO base media file format is called a box. Each box may have a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes. Each box of the ISO base media file may be identified by a four-character code (4CC, fourCC).

A four-character code may interchangeably be represented by a 32-bit unsigned integer (by assuming a certain conversion of characters to 8-bit values, a certain bit endianness, and a certain byte endianness). The header may provide information about the type and size of the box.

According to the ISO family of file formats, a file may include media data and metadata that may be enclosed in separate boxes. In an example embodiment, the media data may be provided in a media data (mdat) box and the movie (moov) box may be used to enclose the metadata. In some cases, for a file to be operable, both of the mdat and moov boxes must be present. The movie (moov) box may include one or more tracks, and each track may reside in one corresponding track (trak) box. Each track is associated with a handler, identified by a four-character code, specifying the track type. Video, audio, and image sequence tracks can be collectively called media tracks, and they contain an elementary media stream. Other track types comprise hint tracks and timed metadata tracks. Tracks comprise samples, such as audio or video frames. A media track refers to samples (which may also be referred to as media samples) formatted according to a media compression format (and its encapsulation to the ISO base media file format). A hint track refers to hint samples, containing cookbook instructions for constructing packets for transmission over an indicated communication protocol. The cookbook instructions may include guidance for packet header construction and may include packet payload construction. In the packet payload construction, data residing in other tracks or items may be referenced. As such, for example, data residing in other tracks or items may be indicated by a reference as to which piece of data in a particular track or item is instructed to be copied into a packet during the packet construction process. A timed metadata track may refer to samples describing referred media and/or hint samples. For the presentation of one media type, one media track may be selected. Samples of a track may be implicitly associated with sample numbers that may be incremented e.g. by 1 in the indicated decoding order of samples. The first sample in a track may be associated with sample number 1.

The 'trak' box contains a Sample Table box. The Sample Table box comprises e.g. all the time and data indexing of the media samples in a track. The Sample Table box is required to contain a Sample Description box. The Sample Description box includes an entry count field, specifying the number of sample entries included in the box. The Sample Description box is required to contain at least one sample entry. The sample entry format depends on the handler type for the track. Sample entries give detailed information about the coding type used and any initialization information needed for that coding.

The ISO base media file format does not limit a presentation to be contained in one file. As such, a presentation may be comprised within several files. As an example, one file may include the metadata for the whole presentation and may thereby include all the media data to make the presentation self-contained. Other files, if used, may not be required to be formatted to ISO base media file format, and may be used to include media data, and may also include unused media data, or other information. The ISO base media file format concerns the structure of the presentation file only. The format of the media-data files may be constrained by the ISO base media file format or its derivative formats only in that the media-data in the media files is formatted as specified in the ISO base media file format or its derivative formats.

The ability to refer to external files may be realized through data references. In some examples, a sample description box included in each track may provide a list of sample entries, each providing detailed information about the coding type used, and any initialization information needed for that coding. All samples of a chunk and all samples of a track fragment may use the same sample entry. A chunk may be defined as a contiguous set of samples for one track. The Data Reference (dref) box, which may also be included in each track, may define an indexed list of uniform resource locators (URLs), uniform resource names (URNs), and/or self-references to the file containing the metadata. A sample entry may point to one index of the Data Reference box, thereby indicating the file containing the samples of the respective chunk or track fragment.

The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited and the use cases mentioned above be realized.

In some examples, the media samples for the movie fragments may reside in an mdat box, if they are in the same file as the moov box. For the metadata of the movie fragments, however, a moof box may be provided. The moof box may include the information for a certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs, each of which document is a contiguous run of samples for that track. Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISO base media file format specification. A self-contained movie fragment may be defined to consist of a moof box and an mdat box that are consecutive in the file order and where the mdat box contains the samples of the movie fragment (for which the moof box provides the metadata) and does not contain samples of any other movie fragment (i.e. any other moof box).

The ISO Base Media File Format contains three mechanisms for timed metadata that can be associated with particular samples: sample groups, timed metadata tracks, and sample auxiliary information. Derived specification may provide similar functionality with one or more of these three mechanisms.

A sample grouping in the ISO base media file format may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping. Sample groupings may be represented by two linked data structures: (1) a SampleToGroup box (sbgp box) represents the assignment of samples to sample groups; and (2) a SampleGroupDescription box (sgpd box) contains a sample group entry for each sample group describing the properties of the group. There may be multiple instances of the SampleToGroup and SampleGroupDescription boxes based on different grouping criteria. These may be distinguished by a type field used to indicate the type of grouping. The 'sbgp' and the 'sgpd' boxes may be linked using the value of grouping_type and, in some versions of the boxes, also the value of grouping_type_parameter. The 'sbgp' box indicates the index of the sample group description entry that a particular sample belongs to.

Files conforming to the ISOBMFF may contain any non-timed objects, referred to as items, meta items, or metadata items, in a meta box (four-character code: 'meta'). While the name of the meta box refers to metadata, items can generally contain metadata or media data. The meta box may reside at the top level of the file, within a movie box (four-character code: 'moov'), and within a track box (four-character code: 'trak'), but at most one meta box may occur at each of the file level, movie level, or track level. The meta box may be required to contain a 'hdlr' box indicating the structure or format of the 'meta' box contents. The meta box may list and characterize any number of items that can be referred and each one of them can be associated with a file name and are uniquely identified with the file by item identifier (item_id) which is an integer value. The metadata items may be for example stored in the 'idat' box of the meta box or in an 'mdat' box or reside in a separate file. If the metadata is located external to the file then its location may be declared by the DataInformationBox (four-character code: 'dinf'). In the specific case that the metadata is formatted using XML syntax and is required to be stored directly in the MetaBox, the metadata may be encapsulated into either the XMLBox (four-character code: 'xml') or the BinaryXMLBox (four-character code: 'bxml'). An item may be stored as a contiguous byte range, or it may be stored in several extents, each being a contiguous byte range. In other words, items may be stored fragmented into extents, e.g. to enable interleaving. An extent is a contiguous subset of the bytes of the resource; the resource can be formed by concatenating the extents.

In order to support more than one meta box at any level of the hierarchy (file, movie, or track), a meta box container box ('meco') may be used as one ISO base media file format. The meta box container box may carry any number of additional meta boxes at any level of the hierarchy (file, movie, or track). This may allow that e.g. the same metadata is being presented in two different, alternative metadata systems. The meta box relation box ('mere') may enable describing how different meta boxes relate to each other, e.g. whether they contain exactly the same metadata (but described with different schemes) or if one represents a superset of another one.

High Efficiency Image File Format (HEIF) is a standard developed by the Moving Picture Experts Group (MPEG) for storage of images and image sequences. The standard facilitates file encapsulation of data coded according to High Efficiency Video Coding (HEVC) standard. HEIF includes a rich set of features building on top of the used ISO Base Media File Format (ISOBMFF).

HEVC-coded content in HEIF format enables a wide range of use cases varying from still picture capture, storage and sharing to multi-image use cases, such as sharing of image bursts or storing sets of images for the purpose of processing those by means of computational photography. Computational photography forms a new category of uses cases that can benefit from the HEIF. A set of related images can be stored in a single file with associated metadata indicating relationships between different pictures. Examples of such emerging use cases include refocusing the shot by selecting an image with a desired focus from a set of picture captured with different focal lengths, high dynamic range photography by combining pictures with different exposures, and building of omnidirectional or panoramic images from a set of pictures with connected scenery.

The ISOBMFF structures and features are used to a large extent in the design of HEIF, and HEIF files also conform to ISOBMFF. The basic design for HEIF comprises that still images are stored as items and image sequences are stored as tracks.

In the context of HEIF, the following boxes may be contained within the root-level 'meta' box and may be used as described in the following. In HEIF, the handler value of the Handler box of the 'meta' box is 'pict'. The resource (whether within the same file, or in an external file identified by a uniform resource identifier) containing the coded media data is resolved through the Data Information ('dinf') box, whereas the Item Location ('iloc') box stores the position and sizes of every item within the referenced file. The Item Reference ('iref') box documents relationships between items using typed referencing. If there is an item among a collection of items that is in some way to be considered the most important compared to others then this item is signaled by the Primary Item ('pitm') box. Apart from the boxes mentioned here, the 'meta' box is also flexible to include other boxes that may be necessary to describe items.

Any number of image items can be included in the same file. Given a collection images stored by using the 'meta' box approach, it sometimes is essential to qualify certain relationships between images. Examples of such relationships include indicating a cover image for a collection, providing thumbnail images for some or all of the images in the collection, and associating some or all of the images in a collection with auxiliary image such as an alpha plane. A cover image among the collection of images is indicated using the 'pitm' box. A thumbnail image or an auxiliary image is linked to the primary image item using an item reference of type 'thmb' or 'auxl', respectively.

HEIF supports derived images. An item is a derived image, when it includes a 'dimg' item reference to another item. A derived image is obtained by performing a specified operation, such as rotation, to specified input images. The operation performed to obtain the derived image is identified by the item_type of the item. The image items used as input to a derived image may be coded images, e.g. with item type 'hvc1', or they may be other derived image items. HEIF includes the specification of the clean aperture (i.e. cropping) operation, a rotation operation for multiple-of-90-degree rotations, and an image overlay operation. The image overlay 'iovl' derived image locates one or more input images in a given layering order within a larger canvas. The derived image feature of HEIF is extensible so that external specifications as well as later version of HEIF itself can specify new operations.

The following definitions may be used e.g. in the context of HEIF or similar file formats. A coded image may be defined as a coded representation of an image. A derived image may be defined as an image that is represented in a file by an indicated operation to indicated images and can be obtained by performing the indicated operation to the indicated images. An image may be defined as a coded image, a derived image, or one or more arrays of pixels of different colour components, depending on the context where the term image is used. An image collection may be defined as a set of images stored as items of a single file according to HEIF (or alike). An auxiliary image may be defined as an image that may not be intended to be displayed but provides supplemental information, such as transparency data, complementing a respective primary image. A cover image may be defined as an image that is representative of an image collection or an image sequence and should be displayed when no other information is available on the preferred displaying method of the image collection or the image sequence. A pre-computed derived image may be defined as a coded image that has been derived from one or more other images. A master image may be defined as an image that is stored as an item and is not an auxiliary image or a thumbnail image. A thumbnail image may be defined as a smaller-resolution representation of a primary image.

A file that contains an image sequence comprises file metadata for the tracks, which file metadata can be stored in the Movie box ('moov') and its child boxes. The file metadata includes for example information where in the file to locate the coded media data for the tracks. Each track has a type, identified by a four-character handler code. HEIF specifies also a handler type 'pict' for image sequences. Tracks comprise samples, such as audio or video frames, which are stored in the Media Data box ('mdat') or in an external file.

An image sequence track can be used for a set of images where inter picture prediction is used to improve compression performance or when an image sequence is associated with timing information. In the former case, a non-timed playout, such as showing the images in a gallery view, should be chosen by the player, while in the latter case, the image sequence should be played as a timed slideshow. As opposed to video tracks, the timing in the image sequence track may be considered advisory. HEIF provides means to indicate which one of these two is the preferred playback method. In order to distinguish between image sequences and motion video, a new handler type 'pict' has been introduced in HEIF.

HEIF includes specifications to encapsulate (by inclusion and/or by reference) HEVC coded still images and image sequences into files conforming to the HEIF. It is possible to specify encapsulation of images and image sequences coded with other coding formats into files conforming to HEIF.

An entity may be defined as a collective term of a track or an item. An entity group is a grouping of items, which may also group tracks. An entity group can be used instead of item references, when the grouped entities do not have clear dependency or directional reference relation. The entities in an entity group share a particular characteristic or have a particular relationship, as indicated by the grouping type.

In HEIF and/or ISOBMFF, entity groups are indicated in GroupsListBox. Entity groups specified in GroupsListBox of a file-level MetaBox refer to tracks or file-level items. Entity groups specified in GroupsListBox of a movie-level MetaBox refer to movie-level items. Entity groups specified in GroupsListBox of a track-level MetaBox refer to track-level items of that track. GroupsListBox contains EntityToGroupBoxes, each specifying one entity group.

One of the entity grouping types may enable grouping of image items and tracks of a file into one or more alternate groups (i.e. one or more groups of alternative entities or alternate entity groups). The items and tracks mapped to a group of this grouping type are alternatives to each other, and only one of them should be played (when the mapped items and tracks are part of the presentation; e.g. are displayable image items or tracks) or processed by other means (when the mapped items or tracks are not part of the presentation; e.g. are metadata). Players should select one image item or track of an alternate group for playback. The items and tracks of an alternate group may be listed in their preference order.

Files conforming to HEIF may start with a File Type box ('ftyp'), which contains a list of brands the file complies with. A brand can be identified by its unique four-character code. The specification of a brand can include requirements and constraints for files of the brand and for file players supporting the brand. A brand included in the File Type box permits a player supporting the requirements of the brand to play the file.

Internet media types, also known as MIME (Multipurpose Internet Mail Extension) types, are used by various applications to identify the type of a resource or a file. MIME types consist of a media type ('image' in the case of HEIF files), a subtype, and zero or more optional parameters.

As described, MIME is an extension to an email protocol which makes it possible to transmit and receive different kinds of data files on the Internet, for example video and audio, images, software, etc. An internet media type is an identifier used on the Internet to indicate the type of data that a file contains. Such internet media types may also be called as content types. Several MIME type/subtype combinations exist that can contain different media formats. Content type information may be included by a transmitting entity in a MIME header at the beginning of a media transmission. A receiving entity thus may need to examine the details of such media content to determine if the specific elements can be rendered given an available set of codecs. Especially, when the end system has limited resources, or the connection to the end systems has limited bandwidth, it may be helpful to know from the content type alone if the content can be rendered.

Two parameters, 'codecs' and 'profiles', are specified to be used with various MIME types or type/subtype combinations to allow for unambiguous specification of the codecs employed by the media formats contained within, or the profile(s) of the overall container format.

By labelling content with the specific codecs indicated to render the contained media, receiving systems can determine if the codecs are supported by the end system, and if not, can take appropriate action (such as rejecting the content, sending notification of the situation, transcoding the content to a supported type, fetching and installing the required codecs, further inspection to determine if it will be sufficient to support a subset of the indicated codecs, etc.).

For file formats derived from the ISOBMFF, the codecs parameter may be considered to comprise a comma-separated list of one or more list items.

When a list item of the codecs parameter represents a track of an ISOBMFF compliant file, the list item may comprise a four-character code of the sample entry of the track. For HEVC, the format of the list item is specified in ISO/IEC 14496-15.

When a list item of the codecs parameter indicates an item of a HEIF compliant file, the string 'metaitem.' is followed by one or more plus ('+') separated item descriptions, each of which starts with the four-character item type of a coded image or a derived image. When the item type is a four-character code of a coded image, it is followed by a dot-separated ('.') profile-tier-level value specified for the codecs parameter of the ISOBMFF namespace. For HEVC, the format of profile-tier-level value is specified in ISO/IEC 14496-15. When the item type is a four-character code of a derived image, it may be followed by a dot-separated ('.') pixel count value that is the positive decimal integer indicating the number of pixels that is required for the input images of the derived image and the derived image itself. The pixel count value may be required to be present for an item description that requires the greatest number of pixels, when that pixel count value is greater than twice the largest pixel count inferred from the profile-tier-level value of any coded image of the same list item.

The profiles MIME parameter can provide an overall indication, to the receiver, of the specifications with which the content complies. This is an indication of the compatibility of the container format and its contents to some specification. The receiver may be able to work out the extent to which it can handle and render the content by examining to see which of the declared profiles it supports, and what they mean. The profiles parameter for an ISOBMFF file may be specified to comprise a list of the compatible brands included in the file.

One of original motivations for MIME is the ability to identify the specific media type of a message part. However, due to various factors, it is not always possible from looking at the MIME type and subtype to know which specific media formats are contained in the body part or which codecs are indicated in order to render the content.

There are several media type/subtypes (either currently registered or deployed with registration pending) that contain codecs chosen from a set. In the absence of the parameters described in this disclosure, it is necessary to examine each media element in order to determine the codecs or other features required to render the content.

The parameter value of the codecs parameter is specified as follows: a single value, or a comma-separated list of values identifying the codec(s) indicated to render the content in the body part. Each value consists of one or more dot-separated elements. The name space for the first element is determined by the MIME type. The name space for each subsequent element is determined by the preceding element.

Progressive download information box of ISOBMFF is a file-level box that aids the progressive download of an ISOBMFF file. The box contains pairs of number (to the end of the box) specifying combinations of effective file download bitrate in units of bytes/sec and a suggested initial playback delay in units of milliseconds. A receiving party can estimate the download rate it is experiencing, and from that obtain an upper estimate for a suitable initial delay by linear interpolation between pairs, or by extrapolation from the first or last entry. The progressive download information box is desired to be placed as early as possible in files, for maximum utility.

Progressive download profile of 3GPP file format consists of the following constraints for files: the 'moov' box shall be placed right after the 'ftyp' box in the beginning of the file; and all media tracks (if more than one) shall be interleaved with an interleaving depth of one second or less.

The progressive download indications disclosed above deal with progressive downloading of tracks (e.g. audio and video tracks). They are not used for indicating anything regarding progressive refinement of image items and/or image sequences.

Progressive refinement may comprise displaying a basic or coarse representation of a media file, such as a HEIF file, and gradually refining or enhancing that representation over time. Gradual refinement may comprise one or more refinement steps. The refinement or enhancement may take different forms, such as but not limited to one or more of the following: spatial refinement (which may be perceived by an increased amount of and/or finer details), gradual increments towards broader or richer color representation, dynamic range refinement, and temporal refinement (e.g. enhancing a still picture to become an animation and/or increasing the picture rate of a timed sequence, which may be repetitively played).

Currently, the HEIF does not provide a mechanism to indicate whether contents of the file are ordered in a manner that progressive refinement of a group of alternative entities (i.e. image items and/or image sequences) is possible. For example, when a file contains an alternate group consisting of a cover image, a thumbnail image of the cover image and an image sequence representing an animation, there is no information on how the file is organized, for example, does the thumbnail precede the cover image and does the cover image precede the animation. In addition, the current HEIF does not provide a mechanism to indicate whether the file author wishes to display a group of alternative entities in a manner that is subjectively experienced as a progressive refinement. For example, when a file contains an alternate group consisting a cover image, a thumbnail image of the cover image, and an image sequence representing an animation, there is no information on whether the file author wishes to display the thumbnail first, the cover image next and then the animation.

In some cases, the above issues may be determined before the downloading of a file is started. For example, file player may be instantiated and/or operate differently when a whole file is available compared to when progressive refinement is in use. As an example of instantiation, the file player may select an entity from an alternate group that best suits the application needs, and which can be decoded by the file player—e.g. display an animation right away. As an example of different operation, the file player may consistently check whether newly available portions of the file allow for decoding and displaying the next entity in a group of alternative entities.

The present embodiments provide a multimedia container file that may be considered to have progressive refinement capability, when the following conditions are fulfilled: i) the file metadata precedes the coded media data so that the coded media data can be decoded without receiving file metadata subsequent, in the file, to the coded media data; ii) it is known or indicated which coded media entities in the file are alternatives to each other, wherein a coded media entity may be a media item, such as an image, or a continuous media item, such as a timed image sequence, a video clip, or an audio clip; iii) the coded media entities that are alternatives to each other are arranged in the file so that when they are displayed successively in the order that they are present in the file, a progressive refinement or enhancement is obtained. In some embodiments, a media item is static, i.e. represent content that does not evolve as a function of time, such as an image. In other embodiments, a media item may be dynamic, e.g. represent a timed image sequence, or static. A dynamic media item may lack accurate synchronization means to other dynamic media items or media tracks.

According to an embodiment, a file creator is configured to order the elements of a file so that the file has a progressive refinement capability, and to indicate—in the file or in a description of the file—that progressive refinement can be applied when playing the file. On the other hand, a file player is—according to an embodiment—configured to parse an indication—from the file or from a description of the file—that progressive refinement can be applied when playing the file; and in response to the indication, to display coded media entities of the file so that the progressive refinement is obtained.

The indication that the progressive refinement can be applied when playing the file can indicate one or both of the following: i) the coded media entities are ordered in the container file in a progressive refinement order; ii) it is allowed to decode and display the coded media entities in their order in the container file and display them successively.

In an embodiment, a file creator indicates, in the file or in a description of the file, that the file contains an entity group and that the entities of the entity group are ordered in the file in a progressive refinement order. A first indication may be created for a first entity group of the file, and a second indication, separate from the first indication, may be created for a second entity group of the file. In some cases, the mentioned entity groups may be pre-defined to be alternate groups, while in other cases the indication included in the file or in the description of the file may additionally specify a grouping type to which the indication applies. For example, the grouping type may be set to 'altr' for alternate entity groups or another specific value (here 'spre') for indicating that the image items of the group may be regarded as a summary of the image sequence track and hence may e.g. be used as a preview or such of the track. When the alternate group is indicated in a preference order, the progressive refinement order may be a reverse of the preference order. In an embodiment, a file player parses, from the file or from a description of the file, that the file contains an entity group and that the entities of the entity group are ordered in the file in a progressive refinement order. In some cases, the mentioned entity groups may be pre-defined to be alternate groups, while in other cases the file player may parse from an indication in the file or in the description of the file a grouping type to which the indication applies. The file player determines or is instructed to display entities of said entity group. At least two entities of the entity group are reconstructed and displayed, by the file player, in said progressive refinement order.

In addition to the indication that progressive refinement can be applied, a file creator may indicate in a file and/or a file player may parse from a file one or more suggested playback modes for the file including but not limited to the following:
  a) a cover content playback mode, which is a progressive playback of a thumbnail of the cover image (if any), the cover image, and any image sequence that is indicated to be an alternative of the cover image, where the playback takes place on the same display window or canvas;
  b) an image sequence preview mode, which relates to playback of image items in the order they appear in the file until an image sequence track is received, after which the video track or an image sequence track is played. This can be used e.g. when image items represent a preview of the content in the track. The image items may be for example selected intra-coded frames of the track. By referencing to the same media data from an image item and from a sample of a track, duplication of coded data can be avoided. The indication that the progressive refinement can be applied may indicate that coded data for the image items appears in the file prior to those coded frames that are only used as samples of a track;
  c) a gallery refinement mode, which relates to a playback of an image collection in a gallery mode or alike. The indication that progressive refinement can be applied may indicate that the thumbnails for all images in the image collection appear in the file prior to any master image;

d) a stereoscopic 3D playback mode, where the content is played on a stereoscopic display arrangement (e.g. a device with a two-view autostereoscopic display, or a display or projector requiring the use of shutter or polarizing viewing glasses). The indication that progressive refinement can be applied may indicate that an image to be displayed for both the left and right eye is first in the file order; i.e. the progressive refinement starts with a 2D image being displayed. This image may be the left-eye image or the right-eye image for the stereo pair to be displayed, or any other image, such as an image from a camera in the middle of the left-eye and right-eye cameras. After that, zero or more depth or disparity images may follow in file order. A depth or disparity image (together with the first image) facilitates depth-image-based rendering (DIBR) to be applied for the generation of one or more synthesized images, and hence reproduction of a stereoscopic 3D representation. It is noted that due to occlusion (foreground objects covering background) and for any other reason, the synthetic image created by DIBR is imperfect. After that, one or two images for the stereo pair may follow in the file order. In displaying, the synthetic image(s) are replaced by these one or two images, which causes a perception of progressive refinement due to reduction of view synthesis impairments. After that, and image sequence with stereoscopic 3D content may follow in the file order. The content may reside for example in one track (containing both views) or two tracks (each containing one view). Similar playback modes and file arrangements can be done also for multiview 3D playback or free-viewpoint navigation playback.

Figure 6:
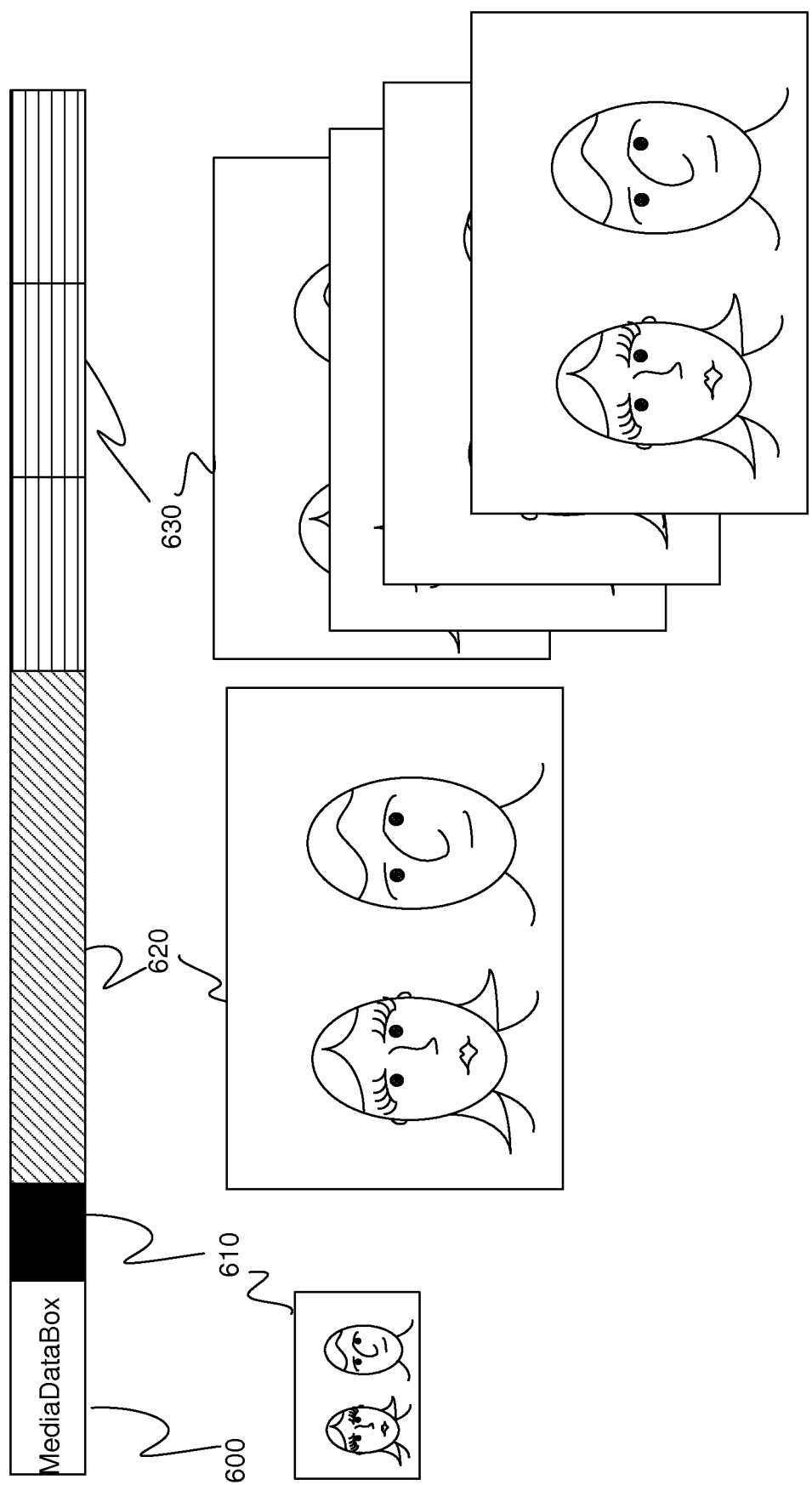
FIG. 6 illustrates an order of coded data within a Media-DataBox.
Figure 7:
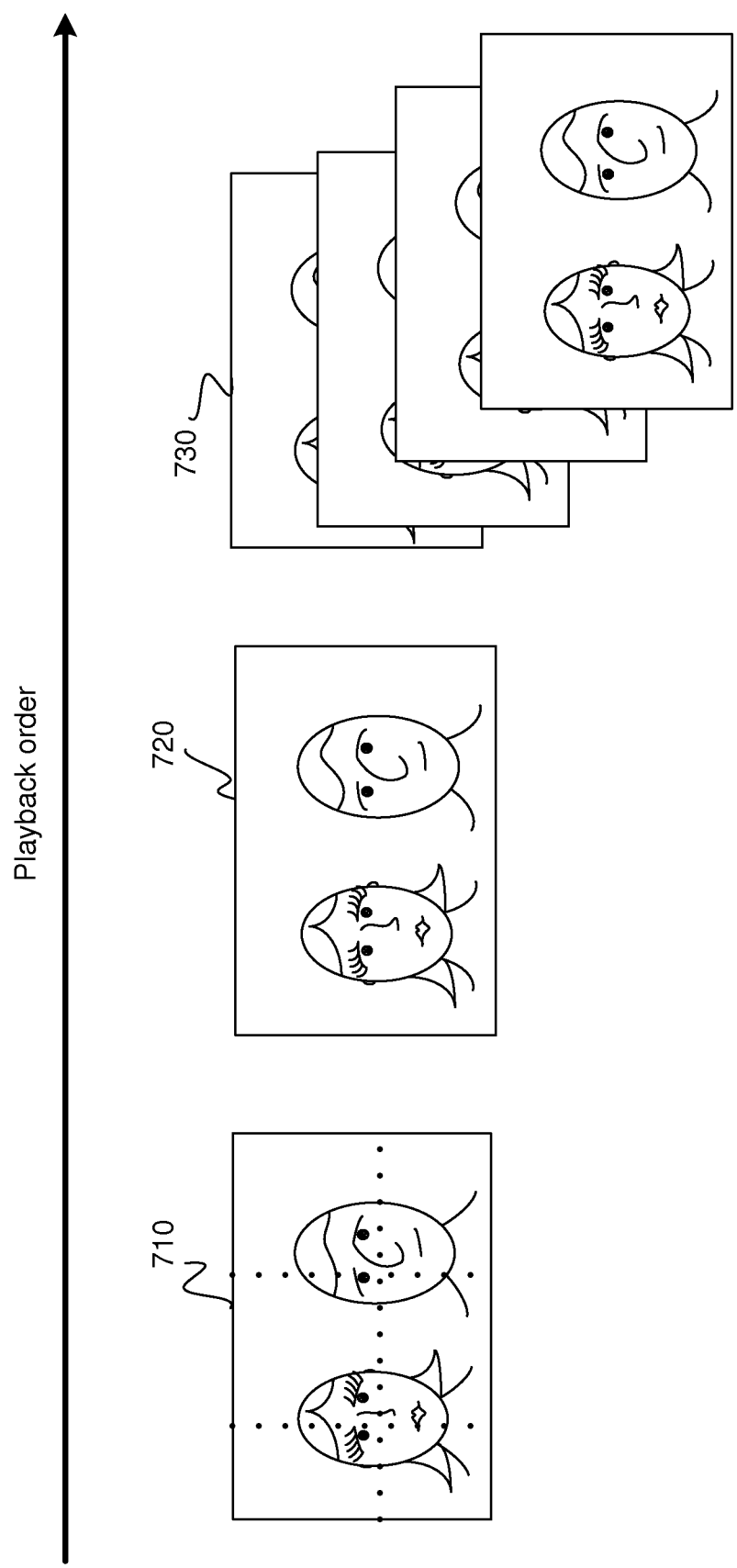
FIG. 7 illustrates a playback operation of an example file.

FIGS. 6 and 7 illustrates examples of how the present embodiments are used.

FIG. 6 illustrates the order of coded data within a MediaDataBox 600 such that enables a progressive refinement for the cover content playback mode. The first coded picture is a thumbnail image 610 of the cover image, the second coded picture is the cover image 620, which is followed by the coded pictures of an image sequence track 630. It is noted that the cover image 620 may also be one of the images in the image sequence track 630.

FIG. 7 illustrates the playback operation of the example file, when the cover content playback mode is in use. First the thumbnail image 710 is upscaled to the size of the display window and displayed, where the upscaling is indicated by the dotted lines in FIG. 7. Then, when the cover image 720 is downloaded and decoded, it replaces the thumbnail image 710 in the display window. After that, when the image sequence track 730 is received the timed playback of the image sequence takes place in the display window. In some cases, the image sequence track 730 can be progressively downloaded, i.e. it does not have to be fully downloaded at the point when its playback starts.

The above described playback mode may affect the constraints for a file to have progressive refinement capability. According to embodiments, the playback mode may be pre-defined for example in a coding standard. As mentioned above, according to embodiments, a file creator may indicate in a file one or more suggested playback modes for the file. According to embodiments, a file player may parse from a file one or more suggested playback modes for the file. A file player may select the playback mode from the parsed one or more suggested playback modes e.g. based on the application or on application settings or other user input. In the absence of indications of one or more suggested playback modes for the file, the file player may choose a default playback mode, such as playing selected entity or entities among those entities that are in the alternate group containing the cover picture—this playback mode is here referred to as cover content playback. In some embodiments, a file player may choose a default playback mode regardless of whether or not indications of one or more suggested playback modes are present in the file. In some embodiments, a file player may conclude which playback modes are facilitated by the order of entities in the file, wherein the order of entities may be concluded for example based on the information of the grouping type of an entity group for which progressive refinement capability is indicated as described above. The file player may then select the playback mode among the playback modes that are facilitated by the order of entities in the file.

In different embodiments, said two or more entities can be for example, but are not limited to, the following or any combination of the following: i) a thumbnail image and the respective master image; ii) a cover image and a timed image sequence; iii) a thumbnail image for the cover image, the cover image, and a timed image sequence; iv) images representing the same original image but having different spatial resolutions, picture quality, bit-depth, color gamut, and/or dynamic range; v) scalably coded images representing the same original image but having different spatial resolutions, picture quality, bit-depth, color gamut, and/or dynamic range; vi) images representing different views of the same content—for example, the first image in the file order may represent a single view or camera, whereas the second image in the file order is the stereo pair of the first image, facilitating stereoscopic viewing of the content; in another example, the first image in the file order may represent a narrow field of view, whereas the second image in the file order may represent a panoramic or wide field-of-view representation of the same content. In these examples, the second image may be coded independently of the first image, or may use prediction from the first image.

In some embodiments, the selection of the two or more entities is inferred from the pre-defined or indicated suggested playback mode(s).

According to an embodiment, when the pre-defined or indicated suggested playback mode is cover content playback mode, the two of more entities comprise the entities that are in the alternate group containing the cover image.

According to embodiment, a HEIF file or an ISOBMFF file may be determined to have progressive refinement capability for the cover content playback mode, when the following is fulfilled: i) all MediaDataBoxes follow the MovieBox; ii) no movie fragments are present or all MediaDataBoxes containing data for a movie fragment follow the respective MovieFragmentBox; iii) the coded data of at least one image item precedes the coded data of the respective image sequence track or the respective video track. The coded data of said at least one image item may reside in the ItemDataBox (of the file-level MetaBox) or in a MediaDataBox.

Additionally, a file with progressive refinement capability for the image sequence preview mode (as specified above) may be indicated to be progressively downloadable e.g. with the presence of Progressive download information box. A player may therefore at first display the image items whose coded data appears in file order prior to the coded data of the tracks that can be progressively downloaded, i.e. decoded and displayed while the remaining data is still being downloaded.

According to embodiments, a HEIF file or an ISOBMFF file may be determined to have progressive refinement capability for the image sequence preview mode, when the following is fulfilled: i) all MediaDataBoxes follow the MovieBox; ii) no movie fragments are present or all MediaDataBoxes containing data for a movie fragment follow respective MovieFragmentBox; iii) the coded data of at least one image item precedes the coded media data of the last sample of the respective image sequence track or the respective video track. The coded data of said at least one image item may reside in the ItemDataBox (of the file-level MetaBox) or in a MediaDataBox. The coded data of said at last one image item may reside in the same byte range as the coded data for a sample in the respective image sequence track or the respective video track.

When with progressive refinement capability for the image sequence preview mode is defined in this manner, image items may be displayed prior to receiving the respective image sequence or video track completely or prior to starting the decoding/display of the track.

According to an embodiment, when the pre-defined or indicated suggested playback mode is the gallery refinement mode, the two or more entities comprise the master image items of the file and their thumbnail image items.

According to embodiments, a HEIF file or an ISOBMFF file may be determined to have progressive refinement capability for the gallery refinement mode, when the following is fulfilled: the coded data of all thumbnail image items precedes the coded data of any master image item.

The indication that the two or more entities can be played in the order they appear in the container file to achieve progressive refinement can be realized for HEIF and ISOBMFF files with one or more of the following embodiments.

1) A progressive refinement brand, referred to with a four-character code 'mprr', is specified for the HEIF (or ISOBMFF). Files that have the progressive refinement capability (as specified above) may contain the brand 'mprr' in the compatible brands array of the FileTypeBox in addition to one or more other brands specified in HEIF. Note that 'mprr' should not be used as a major brand. Consequently, the MIME type for the file can also include the 'mprr' brand indication in the value for the optional profiles MIME parameter. In some embodiments, different four-character codes may be defined for each playback mode for which progressive refinement can be applied.

2) A new box, referred to as ProgressiveRefinementBox, can be specified. It should be understood that while the embodiment is described with reference to a single ProgressiveRefinementBox, the embodiment can be similarly realized with more than one box including information similar to that described for the ProgressiveRefinementBox.

According to embodiments, the ProgressiveRefinementBox may be indicative of the suggested playback modes. For example it may contain a list of four-character codes indication which are the suggested playback modes.

According to embodiments, the presence of the ProgressiveRefinementBox can indicate that the two or more entities can be played in the order they appear in the container file.

According to embodiments, the box contents may contain further information of the progressive refinement capability. The ProgressiveRefinementBox may be indicative of the entity group(s) for which the progressive refinement is indicated. For example, the box may identify the alternate groups for which the progressive refinement capability applies. The ProgressiveRefinementBox should appear early in the file, e.g. right after the FileTypeBox that starts the file.

In the case where the media file is fragmented, each fragment may contain a ProgressiveRefinementBox appearing early in the fragment or segment.

3) A new box, here referred to as MediaDataDirectoryBox, can be specified. The presence of the MediaDataDirectoryBox can indicate that the file metadata appears before the respective coded media data in the file order, e.g. that the MovieBox appears before the MediaDataBox(es). The box includes a representation of the order of the entities within the MediaDataBox(es). For example, the box may include a list, wherein each list item identifies a particular sample of a particular track (e.g. with the track ID value and the sample number), and/or an entity for indicated one or more items, and/or an entire item, and the order of the list items indicates the order the respective entities appear in the MediaDataBox(es). The MediaDataDirectoryBox should appear early in the file, e.g. right after the FileTypeBox that starts the file.

4) A new box, here referred to as DirectoryBox, can be specified. The DirectoryBox indicates the box order of the file. It may for example contain a hierarchical list of the four-character codes of all boxes appearing in the file, in their appearance order. The list may be hierarchical, i.e. indicate how boxes are nested within their container box. In case of a MediaDataBox, the DirectoryBox may contain information of the MediaDataDirectoryBox or may contain or refer to the MediaDataDirectoryBox. The DirectoryBox should appear early in the file, e.g. right after the FileTypeBox that starts the file. According to embodiments, the DirectoryBox and/or the MediaDataDirectoryBox are used e.g. by a player to determine the suggested playback modes. For example, if a file is determined to have progressive refinement capability for the cover content playback mode, based on the box and/or media data order given in the DirectoryBox and/or the MediaDataDirectoryBox, respectively, the suggested playback modes may include the cover content playback mode. A similar investigation may be performed for any other playback mode(s) too.

5) A header or an extension mechanism of a transmission protocol may convey the indication. For example, an HTTP (Hypertext Transfer Protocol) header, here referred to as Progressive-Content, may be defined. The Progressive-Content header may be added into an HTTP GET response message, when the payload of the response message contains a file for which progressive refinement can be applied. The value of the Progressive-Content header may be empty (in which case a pre-defined playback mode may be assumed and used by the player) or may contain a list of suggested playback modes. Alternatively or in addition, any other further information on the progressive refinement capability may be provided in the value of the Progressive-Content header, similarly to what has been described for other embodiments.

6) A new optional MIME parameter, here referred to as progressive-refinement, can be specified for HEIF (or ISOBMFF) files. The presence of progressive-refinement parameter may indicate that the two or more entities can be played in the order they appear in the container file to achieve progressive refinement. The value of the progressive-refinement may indicate further information of the progressive refinement capability. For example, the value the progressive-refinement parameter may be a white-space-separated or comma-separated list of indices, where the indices refer to the list items of the optional codecs parameter and the order of the indices indicates the order that the respective entities appear in the file. As a list item of the codecs parameter indicates e.g. whether the entity is a track or an item and the coding format of the entity, and the profile and level of the entity, the further information may help in determining which entities the player can use for obtaining in the progressive refinement.

It may be further indicated which entities are alternatives to each other in the file. This may be achieved for example in one of the following ways:

a) by including a progressive-refinement parameter as specified above per each alternate group;

b) by defining a new optional MIME parameter, here referred to as alt-group, for HEIF (or ISOBMFF) files. The value of the alt-group parameter may be a white-space-separated or comma-separated list of indices, where the indices refer to the list items of the optional codecs parameter. The value of the progressive-refinement parameter may then indicate which alternate group(s) it applies (rather than including indices to the codecs parameter). This design enables having progressive refinement capability for selected (but not necessarily all) alternate groups of the file.

A MIME type, including the progressive-refinement parameter and its value (if any), may be conveyed as a part of a protocol header or such and/or may be included in a content description. For example, an HTTP GET response message may include the Content-Type header, which contains the MIME type of the payload of the response message, where the MIME type may include optional MIME parameters. In another example, the MIME type (which may include optional MIME parameters) is included in the type attribute of the source element of a picture element within HTML 5 code.

As described above, in some embodiments, the two or more entities to which the indication applies may be inferred from the inferred or indicated suggested playback mode(s).

As described above, in some embodiments, the indication that progressive refinement can be applied may include or be associated with information on which entities are the two or more entities to which the indication applies.

The scope of the indication that the two or more entities can be played in the order they appear in the container file can be pre-defined e.g. in the HEIF standard or can be indicated in the file or in a description of the file e.g. to be one or more of the following: i) the indication concerns the cover image and all entities that are in the alternate group that also contains the cover image; ii) the indication additionally indicates that all entities in the file are alternatives to each other, and the indication concerns all entities included in the file; iii) the indication concerns separately each alternate group indicated in the file; iv) the indication is accompanied with information which alternate groups it concerns (i.e. "alt-group" described above).

The information on which entities are the two or more entities to which the indication applies may for example include one or more of the following: i) item identifiers or alike for entities that are image items; ii) track identifiers or alike for entities that are tracks; iii) group identifiers or alike for alternate groups that are associated with a suggested playback mode, such as the alternate group that contains the cover image in the cover content playback mode.

According to embodiments, the one or more suggested playback mode(s) are inferred from the two or more entities that are inferred or indicated to be in the scope of the indication.

The player may be configured: to parse, from a container file or from a description of the container file, an indication that two or more entities can be played in the order they appear in the container file to achieve progressive refinement, wherein each entity is a media item (such as an image item) or a media track (such as an image sequence track or a video track); to determine a scope for the indication e.g. according to what is described above; in some cases the determination of the scope includes parsing, from the container file, an alternate group that includes the cover picture; to determine which ones of the two or more entities are desirable to be played as progressive refinement; for example, if a player does not support playing of timed image sequences, those may be excluded from those entities that are played as progressive refinement; to play selected entities from the two or more entities successively; for example, if there is a display window or canvas, each selected entity may be scaled to the size of the display window or canvas.

When an entity is scaled to the size of the display window or canvas, the spatial correspondence of the entities of the selected entities may be taken into account so that no movement of the image is perceived during progressive refinement. For example, information according or similar to reference location offsets may be included by a file creator into the file and/or may be parsed by a file player from the file.

The above-described player operation may be used for example when the player operates without user control, e.g. when the container file is included as an image in a web page.

According to embodiments, the player may additionally determine a playback mode as described above.

According to embodiments, the player may be configured to operate under application and/or user control, and the application and/or user may select which playback mode is in use, and may select which alternate group(s) are viewed, if the playback mode gives e.g. a choice of using progressive refinement for more than one alternate group.

According to an embodiment, the above-mentioned indication additionally indicates that certain tracks, if any, are progressively downloadable. The tracks to which the indication applies can be those that are in the scope of the indication (as specified above) and those that are played at the same time as the tracks that are in the scope of the indication, such as audio tracks whose playback time range coincides with the playback time range of an image sequence track that is in the scope of the indication. The capability of progressive downloadability may be specified similarly to the progressive downloading profile of the 3GPP file format.

According to an embodiment, the indication that progressive refinement can be applied when playing the file is indicative which one of the following applies, if neither of the following applies, or if both of the following apply: i) the coded media entities are ordered in the container file in a progressive refinement order; ii) it is allowed to decode and display the coded media entities in their order in the container file and display them successively.

When it is indicated that it is allowed to decode and display the coded media entities in their order in the container file and display them successively but not that the coded media entities are ordered in the container file in a progressive refinement order, file players can choose to operate in progressive refinement mode for example due to faster decoding of entities appearing first in the progressive refinement order and hence being able to display content faster. For example, a player may prefer displaying a thumbnail image as soon as possible, and refine it later with the respective image sequence, even if the image sequence precedes the thumbnail image in the file order.

According to an embodiment, the requirements for a file to be considered to have progressive refinement capability can be relaxed so that the file metadata can succeed the respective coded media data as long as they remain to reside in the same logical unit. For example, it may be allowed that the MovieFragmentBox immediately follows in file order the MediaDataBox containing the media data for the movie fragment. In this case, the MovieFragmentBox and the MediaDataBox can still be considered to reside in the same self-containing movie fragment.

In an embodiment which may be used together with or independently of other embodiments, scalably coded image items may be stored in a HEIF file or alike for example as follows. A bitstream is encoded or otherwise obtained, wherein the bitstream comprises a first picture in an independent layer and a second picture in a predicted layer, where the second picture uses or at least may use the first picture as a reference for inter-layer prediction. The first picture is encapsulated in a file as a first image item, and the second picture is encapsulated in the file as a second image item. A specific item reference (here referred to as 'ilrf') is included into the file, wherein the direction for the item reference may be e.g. from the second image item to the first image item. Direct reference image items for a specific image item may be defined as those image items that are linked to the specific image item by the 'ilrf' item reference, and indirect reference image items for a specific image item may be defined as those image items that are not linked to the specific image item by the 'ilrf' item reference but are direct or indirect reference image items of a direct reference image item of the specific image item. Additionally, zero or more of the following properties may be indicated in the file:
- at least one OLS index for the second image item, wherein the at least one OLS index may be required to refer to such OLS in which the predicted layer (containing the second picture) is an output layer and all the direct and indirect reference pictures of the second picture are included in the file as direct and indirect reference image items of the second image item;
- an OLS index for the first image item, which may be optional if the independent layer is the base layer of the bitstream (and hence the OLS index may be inferred to be 0 in the absence of the OLS index for the first image item);
- at least one profile-tier-level structure or alike that applies to the at least one OLS that is indicated (through the at least on OLS index) or inferred to apply to the second image item;
- at least one profile-tier-level structure or alike that applies to the at least one OLS that is indicated (through the at least on OLS index) or inferred to apply to the first image item.

In an embodiment, more than one coded picture of different layers may be stored into within a same image item. More than one coded picture may be stored into an item having multiple layers only when the item represents an OLS with one output layer (and hence one output picture). This makes it unambiguous which output picture is referred, when the item is used as input to a derived image. Each coded picture in an item comprising multiple coded pictures may be enclosed in its own extent and the same coded picture may be included in multiple items using extents.

In an embodiment which may be used together with or independently of other embodiments, scalably coded image items may be parsed, e.g. by a file player, from a HEIF file or alike for example as follows, when the HEIF file or alike comprises a first picture in an independent layer and a second picture in a predicted layer, where the second picture uses or at least may use the first picture as a reference for inter-layer prediction. It may be determined, e.g. based on the indicated profile-tier-level value(s) for the second picture and other properties indicated for the second picture, that the second picture (or respectively the second image item) is to be displayed. A specific item reference (here referred to as 'ilrf') is parsed from the file, indicating that a second image item is, or at least may be, inter-layer predicted from the first image item. As response to parsing that progressive refinement can be applied for the second image item and/or on the basis of the 'ilrf' item reference, a first image item including the first picture is decapsulated from the file and may be decoded. When the progressive refinement can be applied for the second image item and the first image item is among the entities for said progressive refinement, the decoded first image item may be displayed. A second image item including the second picture is decapsulated from the file and may be decoded. In some cases, an access unit or a bitstream or alike may be reconstructed from the first picture and the second picture, and then the access unit or a bitstream or alike may be decoded. In some cases, at least one OLS index for the second image item may be parsed from the file, wherein the at least one OLS index may be required to refer to such OLS in which the predicted layer (containing the second picture) is an output layer and all the direct and indirect reference pictures of the second picture are included in the file as direct and indirect reference image items of the second image item. One of the at least one OLS index may be provided for decoding the second picture or the access unit or the bitstream or alike.

In an embodiment which may be used together with or independently of other embodiments, scalably coded image items may be stored in a HEIF file or alike for example as follows. A bitstream is encoded or otherwise obtained, wherein the bitstream comprises a first picture in an independent layer and a second picture in a predicted layer, where the second picture uses or at least may use the first picture as a reference for inter-layer prediction. The first picture is encapsulated in a file as a first image item. A second image item is generated into the file, where a first extent points to the first picture (by reference to the same byte range used also in the first image item) and a second extent points to the second picture. Additionally, zero or more of the following properties may be indicated in the file:
- at least one OLS index for the second image item, wherein the at least one OLS index may be required to refer to such OLS in which the predicted layer (containing the second picture) is an output layer and all the direct and indirect reference pictures of the second picture are included in the second image item;

an OLS index for the first image item, which may be optional if the independent layer is the base layer of the bitstream (and hence the OLS index may be inferred to be 0 in the absence of the OLS index for the first image item);

at least one profile-tier-level structure or alike that applies to the at least one OLS that is indicated (through the at least on OLS index) or inferred to apply to the second image item;

at least one profile-tier-level structure or alike that applies to the at least one OLS that is indicated (through the at least on OLS index) or inferred to apply to the first image item.

In an embodiment which may be used together with or independently of other embodiments, scalably coded image items may be parsed from a HEIF file or alike for example as follows, when the HEIF file or alike comprises a first picture in an independent layer and a second picture in a predicted layer, where the second picture uses or at least may use the first picture as a reference for inter-layer prediction, and the first picture is encapsulated in a file as a first image item, and a second image item comprises a first extent pointing to the first picture (by reference to the same byte range used also in the first image item) and a second extent pointing to the second picture. As response to parsing that progressive refinement can be applied for the second image item and that the first image item can be used as a progressive refinement step prior to the second image item, the first image item (or respectively the first picture) may be decoded and displayed. It may be concluded that the first extent refers to the first picture and hence avoid decoding the first picture twice but rather use the already decoded first picture as a reference for inter-layer prediction in decoding the second picture. In some cases, at least one OLS index for the second image item may be parsed from the file, wherein the at least one OLS index may be required to refer to such OLS in which the predicted layer (containing the second picture) is an output layer and all the direct and indirect reference pictures of the second picture are included in the file as direct and indirect reference image items of the second image item. One of the at least one OLS index may be provided for decoding the second image item.

In the above, some embodiments have been described in relation to ISOBMFF and/or HEIF. It needs to be understood that embodiments could be similarly realized with any other file format, such as Matroska.

In the above, some embodiments have been described in relation to a player. It needs to be understood that other terms could be interchangeably used, such as reader, parser, user agent, or client. It needs to be understood that a player can but needs not be a standalone application. A player can be embedded for example in a web browser.

A method according to an embodiment is illustrated in FIG. 8. The method comprises including two or more entities into a container file, wherein each entity is a media item or a media track; and indicating in one of the following: the container file or a description of the container file; that the two or more entities are playable in the order they appear in the container file to achieve progressive refinement.

In the above, some embodiments have been described in relation to a file creator. It needs to be understood that other terms could be interchangeably used, such as writer, file generator, or content provider. It needs to be understood that a creator can but needs not be a standalone application. A creator can be embedded for example in a web server, e.g. using scripts.

A method according to an embodiment is illustrated in FIG. 9. The method comprises parsing an indication from one of the following: a container file or from a description of the container file; that two or more entities are playable in the order they appear in the container file to achieve progressive refinement, wherein each entity is a media item or a media track; and playing at least a subset of the two or more entities in the order they appear in the container file to achieve progressive refinement.

The various embodiments may provide advantages by providing a mechanism to indicate whether an image container file can be played in a progressive refinement manner prior to starting the downloading of the file and/or at the right at the beginning of the file. Hence, the present embodiments reduce the latency between starting to download the file and playing the first version of the content of the file.

The various embodiments of the invention can be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

It is obvious that the present invention is not limited solely to the above-presented embodiments, but it can be modified within the scope of the appended claims.

The invention claimed is:

1. A method comprising:
   encoding a first picture and a second picture as a bitstream and storing the bitstream in a file, wherein the first picture is in an independent layer and the second picture is in a predicted layer, wherein the first picture is a reference for inter-layer prediction for the second picture;
   encapsulating the encoded first picture in the file as a first image item;
   generating into the file a second image item comprising a first extent pointing to the encoded first picture and a second extent pointing to the encoded second picture; and
   encoding an indication in the file of at least one output layer set index for the second image item, wherein the at least one output layer set index refers to an output layer set in which the predicted layer is an output layer of the output layer set, and wherein direct and indirect reference pictures of the second picture are included in the second image item, said output layer comprising a layer of the output layer set operable to be output by a decoder during decoding of at least a portion of the bitstream comprising said output layer set.

2. The method as claimed in claim 1, wherein the first extent points to a contiguous subset of bytes of the encoded first picture, wherein the second extent points to a contiguous subset of bytes of the encoded second picture.

3. The method as claimed in claim 1, wherein the output layer comprises said layer of the output layer set that is output when said decoder operates using the output layer set as a target output layer set.

4. The method as claimed in claim 3, wherein the method further comprises:

encoding an indication in the file of at least one profile-tier-level structure which applies to the at least one output layer set.

5. The method as claimed in claim 3, wherein the method further comprises:
encoding an indication in the file of at least one profile-tier-level structure that is inferred to apply to the second image item.

6. A method for parsing a file comprising:
decoding an encoded first picture and an encoded second picture to provide a first picture and a second picture, wherein the encoded first picture is encapsulated as a first image item, wherein the file comprises a second image item comprising a first extent pointing to the encoded first picture and a second extent pointing to the encoded second picture, and wherein the first picture is in an independent layer and the second picture is in a predicted layer, wherein the first picture is a reference for inter-layer prediction for the second picture; and
decoding an indication from the file of at least one output layer set index for the second image item, wherein the at least one output layer set index refers to an output layer set in which the predicted layer is an output layer of the output layer set, wherein direct and indirect reference pictures of the second picture are included in the second image item, and wherein said output layer comprises a layer of the output layer set operable to be output by a decoder during decoding of at least a portion of a bitstream comprising said output layer set.

7. The method as claimed in claim 6, wherein the first extent points to a contiguous subset of bytes of the encoded first picture, wherein the second extent points to a contiguous subset of bytes of the encoded second picture.

8. The method as claimed in claim 6, wherein the output layer comprises said layer of the output layer set that is output when said decoder operates using the output layer set as a target output layer set.

9. The method as claimed in claim 8, wherein the method further comprises:
decoding an indication from the file of at least one profile-tier-level structure which applies to the at least one output layer set.

10. The method as claimed in claim 8, wherein the method further comprises:
decoding an indication from the file of at least one profile-tier-level structure that is inferred to apply to the second image item.

11. An apparatus comprising at least one processor, and memory including computer program code, the memory and the computer program code configured to, with the at least one processor, cause the apparatus to:
encode a first picture and a second picture as a bitstream and storing the bitstream in a file, wherein the first picture is in an independent layer and the second picture is in a predicted layer, wherein the first picture is a reference for inter-layer prediction for the second picture;
encapsulate the encoded first picture in the file as a first image item;
generate into the file a second image item comprising a first extent pointing to the encoded first picture and a second extent pointing to the encoded second picture; and
encode an indication in the file of at least one output layer set index for the second image item, wherein the at least one output layer set index refers to an output layer set in which the predicted layer is an output layer of the output layer set, and wherein direct and indirect reference pictures of the second picture are included in the second image item, said output layer comprising a layer of the output layer set operable to be output by a decoder during decoding of at least a portion of the bitstream comprising said output layer set.

12. The apparatus as claimed in claim 11, wherein the first extent points to a contiguous subset of bytes of the encoded first picture, wherein the second extent points to a contiguous subset of bytes of the encoded second picture.

13. The apparatus as claimed in claim 11, wherein the output layer comprises said layer of the output layer set that is output when said decoder operates using the output layer set as a target output layer set.

14. The apparatus as claimed in claim 13, wherein the apparatus is further caused to:
encode an indication in the file at least one profile-tier-level structure which applies to the at least one output layer set.

15. The apparatus as claimed in claim 13, wherein the apparatus is further caused to:
encode an indication in the file at least one profile-tier-level structure that is inferred to apply to the second image item.

16. An apparatus for parsing a file comprising at least one processor, and memory including computer program code, the memory and the computer program code configured to, with the at least one processor, cause the apparatus to:
decode an encoded first picture and an encoded second picture to provide a first picture and a second picture, wherein the encoded first picture is encapsulated as a first image item,
wherein the file comprises a second image item comprising a first extent pointing to the encoded first picture and a second extent pointing to the encoded second picture, and wherein the first picture is in an independent layer and the second picture is in a predicted layer, wherein the first picture is a reference for inter-layer prediction for the second picture; and
decode an indication from the file of at least one output layer set index for the second image item, wherein the at least one output layer set index refers to an output layer set in which the predicted layer is an output layer of the output layer set, wherein direct and indirect reference pictures of the second picture are included in the second image item, and wherein said output layer comprises a layer of the output layer set operable to be output by a decoder during decoding of at least a portion of a bitstream comprising said output layer set.

17. The apparatus as claimed in claim 16, wherein the first extent points to a contiguous subset of bytes of the encoded first picture, wherein the second extent points to a contiguous subset of bytes of the encoded second picture.

18. The apparatus as claimed in claim 16, wherein the output layer comprises said layer of the output layer set that is output when said deocder operates using the output layer set as a target output layer set.

19. The apparatus as claimed in claim 18, wherein the apparatus is further caused to:
decode an indication from the file at least one profile-tier-level structure which applies to the at least one output layer set.

20. The apparatus as claimed in claim 18, wherein the apparatus is further caused to:

decode an indication from the file at least one profile-tier-level structure that is inferred to apply to the second image item.

\* \* \* \* \*